United States Patent [19]

Kitami et al.

[11] Patent Number: 5,362,530
[45] Date of Patent: Nov. 8, 1994

[54] GAS-AND-OIL IMPERMEABLE HOSE CONSTRUCTION

[75] Inventors: Tetsu Kitami, Hadano; Osamu Ozawa, Hiratsuka; Jun Mito, Kanagawa, all of Japan

[73] Assignee: The Yokohama Rubber Co., Ltd., Japan

[21] Appl. No.: 163,733

[22] Filed: Dec. 9, 1993

Related U.S. Application Data

[63] Continuation of Ser. No. 764,849, Sep. 24, 1991, abandoned.

[30] Foreign Application Priority Data

Sep. 26, 1990 [JP] Japan ............... 2-256719
Oct. 3, 1990 [JP] Japan ............... 2-266085

[51] Int. Cl.$^5$ .................................. F16L 11/08
[52] U.S. Cl. .............................. 428/36.2; 428/35.3; 428/36.8; 428/35.8; 428/36.91; 428/461; 428/458; 428/465; 428/474.9; 428/475.2; 428/483; 428/494; 428/522; 138/126; 138/127; 138/143

[58] Field of Search ............ 428/35.3, 35.4, 35.8, 428/36.2, 36.7, 36.8, 36.91, 461, 465, 458, 474.9, 475.2, 483, 494, 518, 522; 138/126, 127, 133, 146, 141, 143

[56] References Cited

U.S. PATENT DOCUMENTS

| 4,196,464 | 4/1980 | Russell | 428/36.2 |
| 4,308,896 | 1/1982 | Davis | 428/36.2 |
| 4,905,735 | 3/1990 | Akiyoshi | 428/36.2 |
| 4,950,436 | 8/1990 | Kitami et al. | 264/103 |

Primary Examiner—Ellis P. Robinson
Assistant Examiner—Timothy M. Speer

[57] ABSTRACT

A composite hose is disclosed which is constructed essentially with an inner tube and an outer cover, the inner tube being formed from a composition comprised of a specified polymer alloy of a selected class of polyamide resins and acrylic rubbers and the outer cover from a composition comprised of a specified thermoplastic elastomer of a selected class of polyolefin resins and ethylene-propylene-diene rubbers and butyl-based rubber. Impermeability is greatly improved with respect to refrigerant gases and fuel oils.

33 Claims, 10 Drawing Sheets

GAS-AND-OIL IMPERMEABLE HOSE CONSTRUCTION

This application is a continuation of application Ser. No. 07/764,849, filed Sept. 24, 1991, now abandoned.

BACKGROUND OF THE INVENTION

1. Field of the Invention

This invention relates to hose constructions and has particular reference to a hose suitable for use in transporting or otherwise handling refrigerant gases and fuel oils.

2. Description of the Prior Art

From the standpoint of environmental protection, there has been a strong demand for hoses of high performance or fluid impermeability particularly for use in the transport of refrigerant and fuel fluids. To cope with this trend calls for several important qualities including high impermeation to freon or fluorocarbon gases and to hydrocarbon gases, sufficient proofness to moistures, adequate flexibility and good retention of physical properties even at elevated temperature and hence immunity from fluid leakage out of metal joints at opposed hose ends.

It is known that a permeation-resistant hose can be constructed with an inner or core tube formed of a nitrile or NBR rubber and an outer cover of a chloroprene or CR rubber. This hose is hereunder called a first hose for brevity. As disclosed for instance in U.S. Pat. No. 4,950,436, a more advanced type of hose has been reputed which has a combination core including an inner peripheral wall and an outer peripheral wall. The inner wall disposed for direct contact with a gaseous or liquid fluid is made from a polyamide resin for its good gas-impervious nature and the outer wall from a rubbery material. This double-cored hose is referred to as a second hose.

The second hose is further described in terms of its physical characteristics as compared to the first hose.

1. Gas Impermeation

The second hose has been contrived to inhibit the tendency of the first hose becoming leaky of gas. This quality avoids environmental pollution and in turn ozone depletion. Maintenance-free properties are also improved with a cycle of gas replacement of 10 years. The first hose has a gas leak of 20 to 25 gf/m/72 hr at 100° C. and a gas exchange cycle of 2 years in the case of use of dichlorofluoromethane or CFC 12 as a refrigerant or coolant. To suit maintenance-free transport, the limit of gas leak should be not more than 5 gf/m/72 hr at 100° C.

Trifluoromonofluoroethane or HFC 134a has of late been accepted as a good substitute for the CFC 12 gas. The substitute gas is less likely to erode the ozone layer. The above limit of gas leak applies to the use of HFC 134a.

2. Flexibility

The second hose is designed not only for coolant delivery but also for vibration absorption between a fuel engine and a car body in automotive vehicles. Flexibility is important to that end and should be smaller than 2.0 kgf in bending strength as is acceptable in the first hose.

3. Moisture Proofness

When a relatively large proportion of moisture penetrates through the cover and then the core into a flowing refrigerant, condensation will take place in the refrigerating system and thus damage the corresponding compressor. Moisture permeation should be held to an absolute minimum and set at or below one third as small as the first hose. To be more specific, 0.2 mgf/cm$^2$/day at 50° C. or smaller is acceptable as against 0.6 mgf/cm$^2$/day at 50° C. peculiar to the first hose.

4. Freedom from Fluid Leak out of Metal Joints

The second hose is usually provided at both ends with metal joints clamped for fitting interengagement with the corresponding system. Stress retention should be as great as possible at high temperature. Initial stresses at or near the clamped joints will decline upon exposure of the hose to heat during its use. This causes a sharp drop in residual stress and a fluid leak from and around the hose-to-metal joint.

The second hose has its inherent advantages as it meets with the foregoing physical characteristics. Owing to its double-layered core, however, the second hose needs to be produced with many different steps of processing and also with a vulcanizing step of rubber. This is tedious and costly.

Alternatively, it has been proposed to construct a hose with an inner tube of a single layer formed from a gas-impervious polyamide resin and an outer cover from a moisture-proof fluorine rubber. Although easy to form with a minimum of steps devoid of vulcanization, such single-cored hose is undesirable for practical purposes. It is not sufficiently flexible and prone to soften on application of heat and hence leak at or around the associated metal fittings.

SUMMARY OF THE INVENTION

The present invention seeks to a new hose which is highly gas-impermeable, moisture-proof, flexible and stress-retentive and easy to produce without vulcanization.

Many other objects and advantages of the invention will be apparent from the following description with reference to the accompanying drawings.

In one aspect the invention provides a hose comprising (a) an inner tube formed from a first composition comprised of a polymer alloy in which a continuous phase is constituted by at least one polyamide resin, and a disperse phase is composed of an acrylic rubber, the polyamide resin having been grafted with said acrylic rubber, (b) a reinforcing layer disposed over the core and formed of a synthetic fibrous material or a metallic wiry material, and (c) an outer cover laminated around the reinforcing layer and formed from a second composition comprised of a thermoplastic elastomer in which a continuous phase is constituted by a polyolefin resin, and a disperse phase is composed of at least one of an ethylene-propylene-diene rubber and a butyl-based rubber, the one rubber having been vulcanized at least partly.

In another aspect the invention provide a hose comprising (a) an inner tube including an inner peripheral wall and an outer peripheral wall, the inner peripheral wall being formed from a third composition of at least one polyamide resin or a blend thereof with a polyolefin resin, the outer peripheral wall being formed from a first composition comprised of a polymer alloy in which a continuous phase is constituted by at least one polyamide resin, and a disperse phase is composed of an acrylic rubber, the polyamide resin having been grafted with the acrylic rubber, or from a fourth composition comprised of a thermoplastic elastomer in which a continuous phase is constituted by a polyolefin resin, and a disperse phase is made up of at least one rubber selected from an ethylene-propylene-diene rubber, a butyl-based rubber and an acrylonitrile-butadiene rubber, the one rubber having been vulcanized at least partly, (b) a reinforcing layer disposed over the outer peripheral wall and formed of a synthetic fibrous material or a metallic wiry material, and (c) an outer cover laminated around the reinforcing layer and formed from a second composition comprised of a thermoplastic elastomer in which a continuous phase is constituted by a polyolefin resin, and a disperse phase is composed of at least one of an ethylene-propylene-diene rubber and a butyl-based rubber, the one rubber having been vulcanized at least partly.

DETAILED DESCRIPTION OF THE INVENTION

Figure 1:
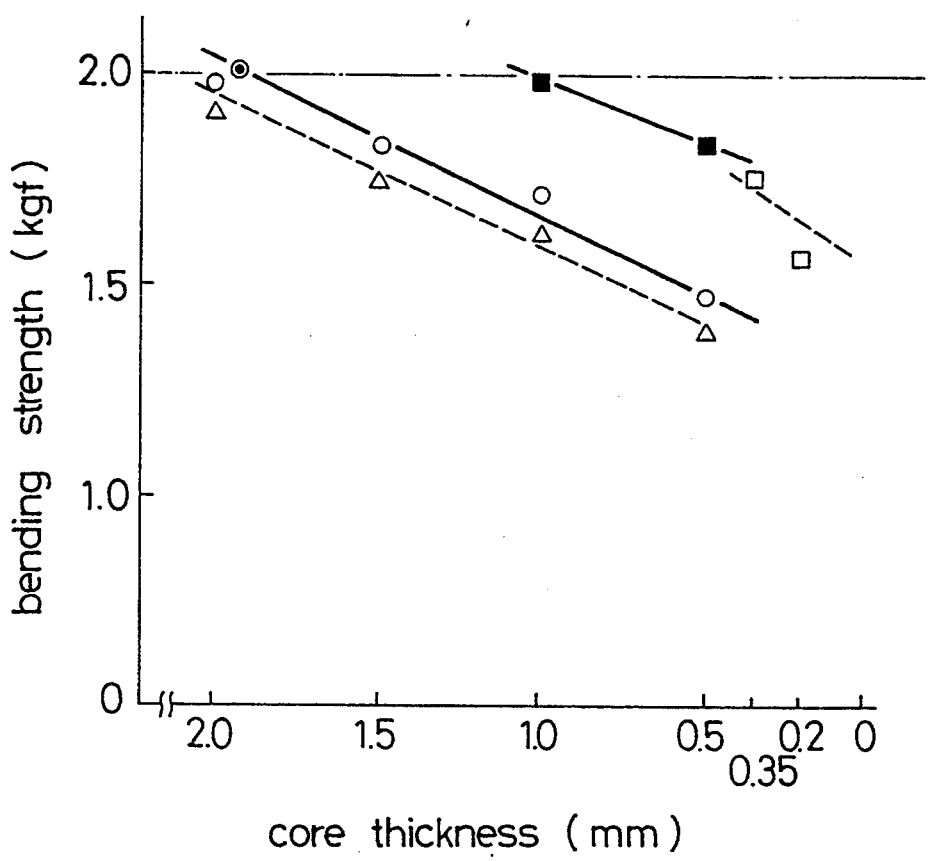
FIG. 1 is a graphic representation of the hose according to a first embodiment of the present invention, showing the bending strength as plotted against the core thickness.

In accordance with a first embodiment of the present invention, a hose is comprised essentially of an inner or core tube of a single-layered structure, a reinforcing layer and an outer cover superimposed in the order mentioned.

For the sake of simplicity, the inner or core tube is hereinafter referred to as a "core" and the outer cover as a "cover". The term core should be construed as cylindrically hollow.

The core used herein is formed by a composition predominantly of a graft polymer alloy in which a continuous phase is constituted by one or more polyamide resins, and a disperse phase is composed of an acrylic rubber, the former resin having been grafted with the latter rubber. In this polymer alloy the acrylic rubber is greater in proportion than the polyamide resin. It usually has a polyamide resin contained as a continuous phase but may be of a salami configuration in which a polyamide resin and an acrylic rubber are varied in their dispersion states with the resin being further dispersed in a disperse or rubbery phase.

Polyamide resins used for the invention may be chosen from homopolymers such as nylon 6, nylon 8, nylon 10, nylon 11, nylon 12, nylon 66 and the like and copolymers such as nylon 6-nylon 66, nylon 6-nylon 12, nylon 12-nylon 12, nylon 6-nylon 66-nylon 610 and the like. They may be used alone or in combination.

Suitable acrylic rubbers include copolymers or ACM rubbers of alkyl acrylate esters with a crosslinkable monomer containing a small amount of chlorine, copolymers or ANM rubbers of alkyl acrylate esters with acrylonitrile, copolymers of alkyl acrylate esters with an active chlorine-containing monomer, copolymers of alkyl acrylate esters with a carboxyl group-containing monomer, copolymers of alkyl acrylate esters with an epoxy group-containing monomer and the like.

The graft polymer alloy according to the invention is unique since it is capable of exhibiting the physical properties inherent to a given polyamide resin as the continuous phase and those inherent to a given acrylic rubber as the disperse phase and moreover of providing synergistic benefits. Such polymer alloy is by nature elastic and notably tough at low temperature, proof to heat aging, impermeable to freon gases, resistant to chemicals such as oils, flexible and retentive of physicochemical properties and also fully processable without addition of plasticizers. Commercially available from DuPont are ETP 40, ETP 60, ETP 80 (N66-ACM), ETP 65 (N6-ACM) and ETP-BMR as equivalent to the polymer alloy according to the invention.

The composition as above specified for core formation may be blended, where desired, with inorganic fillers, pigments, plasticizers and antioxidants.

The cover according to the invention is formed from a composition composed mainly of a thermoplastic elastomer in which are contained a polyolefin resin and one or more rubbers selected from ethylene-propylene-diene or EPDM rubber and butyl-based rubbers and in which a continuous phase is constituted by the resin, and a disperse phase is composed of the rubber or rubbers, the rubber component having been vulcanized at least partly. This thermoplastic elastomer may have, as a salami-like configuration, a polyolefin resin incorporated in dispersed form even into the rubbery phase.

Suitable thermoplastic elastomers fall within those meeting the following physical requirements as stipulated by ASTM D-638 and D-1566, namely (a) a tension set of not more than 160%, preferably below 150%, (b) a compression set of smaller than 50% at 120° C.×72 hr, (c) a Young's modulus or initial tensile elasticity of less than 2,500 kgf/cm$^2$ as a measure of flexibility and (d) a level of rubber-like elasticity up to 120° C. The thermoplastic elastomer according to the invention, because of its strict compliance with the above qualities, shows a physical behavior as to vulcanized rubbers in common use and suits processing like general thermoplastic resins.

Polyolefins useful in the thermoplastic elastomer are isotactic or syndiotactic, crystalline solids of high molecular weights obtainable by low- or high-pressure polymerization of one or more monoolefins such as ethylene, propylene, 1-butene, 1-pentene, 4-methyl-1-pentene and 5-methyl-1-hexene either alone or in combination. Polypropylene is particularly preferred.

Suitable dienes for the EPDM rubber in the thermoplastic elastomer are dicyclopentadiene, ethylidene norbornene, 1,4-hexadiene and the like.

Butyl-based rubbers as components for the thermoplastic elastomer are butyl or IIR rubber, chlorinated butyl or Cl-IIR rubber, brominated butyl or Br-IIR rubber and the like. Better chosen is a Cl-IIR rubber with an average molecular weight of about $35 \times 10^4$ to $45 \times 10^4$ and a chlorination ratio of about 1.1 to 1.3%.

The thermoplastic elastomer according to the invention may be derived for example by taking a melted admixture of a given resin and one or more given rubbers into a Banbury or Brabender mixer or a twin-screw extruder, followed by dispersion of the rubbery phase in comminuted form and by curing of that phase, while in mastication, with addition of a crosslinking agent and a temperature set to facilitate the curing reaction. This is known as dynamic curing or dynamic vulcanization. When EPDM is used as the rubber component, vulcanization is effected preferably with use of a vulcanizing agent such as a phenol-based compound, sulfur or organic peroxide, while a phenol-based compound, sulfur or quinonedioxime-based compound is convenient in curing butyl-based rubbers.

To the thermoplastic elastomer may be added the rubber component in an amount of 25 to 75 parts by weight, preferably 30 to 70 parts by weight, in terms of the resin and rubber being totaled at 100 parts by weight. The particle size of the rubber component dispersed may be set to be not more than 50 $\mu$m, preferably smaller than 20 $\mu$m, more preferably 5 $\mu$m.

The thermoplastic elastomer according to the invention is highly moisture-proof, heat aging-resistant and weather-resistant and fully retentive of physical qualities at elevated temperature. As equivalents to such thermoplastic elastomer are commercially obtainable Monsanto's Santoprene and DSM's Kelpfox, a polypropylene resin component and an EPDM rubber component having been subject to dynamic curing in both products, and Exxon's Trefsin in which polypropylene is used as the resin component and a combination of EPDM and Cl-IIR as the rubber component.

Various other additives may be incorporated in the composition specified for cover formation, and they include inorganic fillers, pigments, plasticizers, antioxidants and the like.

The reinforcing layer interposed between the core and the cover is formed, though not restricted, from synthetic fibers or metallic wires which may be braided or spirally wound. Typical examples of synthetic fibers are vinylon fibers obtainable from Unitica, polyester fibers such as polyethylene terephthalate fibers available as Tetron from Toray, nylon fibers such as nylon 6 and nylon 66 as Leona from Ashi Chemical, rayon fibers, aromatic polyamide fibers and the like. Included metallic wires are steel wires brass-plated to improve rust inhibition and adhesion strength.

A stress crack-inhibiting barrier layer may be assembled into the hose of the invention for particular application.

To produce the hose of the invention, the following process steps are convenient but not restrictive. On an extruder a given polymer alloy-containing composition is extruded into a tubular shape, whereby a core is formed. The resulting core is adhesion-treated over its outer surface on which a given fibrous material is adhesively firmly braided by a braiding machine. Around the braided layer precoated with an adhesive is laminated a cover by extruding a given thermoplastic elastomer-containing composition with use of an extruder. Suitable adhesives are isocyanate-, phenol-, resorcinol- and urethane-based compounds among which the urethane adhesive is more convenient. The hose thus obtained is as contemplated under the invention.

Due to the omission of vulcanization under adverse heat and pressure conditions, the hose of the invention is not susceptible to shrinkage or deformation at the processing stage. This precludes the use of a mandrel except that the hose needs to be dimensioned with greater precision.

A second embodiment of the invention is directed to a hose constructed essentially with a core of a double-layered structure, a cover and a reinforcing layer interposed therebetween. The core includes an inner peripheral wall and an outer peripheral wall.

The inner peripheral wall used herein is formed from a composition comprised of one or more polyamide resins selected from homopolymers such as nylon 6, nylon 8, nylon 10, nylon 11, nylon 12, nylon 66 and the like and copolymers such as nylon 6-nylon 10, nylon 6-nylon 12, nylon 6-nylon 66 and the like.

To simultaneously improve impermeation to freon gases and resistance to stress cracks, the composition used for formation of the inner wall is composed of greater than 60% by weight of nylon 11 and/or nylon 12 and smaller than 40% by weight of other different polyamides such as nylon 6 and the like, preferably a polyblend of nylon 11, nylon 6 and/or nylon 6-nylon 66 and one or more polyolefins. More specifically, the polyblend is composed of 40 to 80 parts by weight of nylon 6 and/or nylon 6-nylon 66, 5 to 30 parts by weight of nylon 11 and/or nylon 12 combined with 10 to 40 parts by weight of one or more polyolefins. Suitable polyolefins are polyethylene, polypropylene, ethylene-propylene copolymer and their derivatives obtainable by addition reaction with maleic acid.

The above specified polyblends are highly impermeable to freon gases, less extractable with fuel oils such as gasoline and with alcohols, sufficiently resistant to stress crack and fully acceptable in flexibility.

The outer peripheral wall according to the invention is formed from either one or both of a composition comprised of a polymer alloy and a composition comprised of a first thermoplastic elastomer. The polymer alloy used here is substantially the same as intended for core formation in the first-embodied hose, and no further explanation is believed necessary with regard to the resinous and rubbery components, graft and disperse configurations, different additives, physical characteristics, commercial equivalents and other details. The first thermoplastic elastomer according to the second embodiment is configured to have as a continuous phase one or more polyolefins and as a disperse phase at least one rubber selected from an ethylene-propylene-diene or EPDM rubber, a butyl-based rubber and an acrylonitrile-butadiene or NBR rubber as will be later described in connection with a similar or second thermoplastic elastomer employed to form the cover in the second-embodied hose.

One and the same thermoplastic elastomer is contemplated in forming the cover of each of the first- and second-embodied hoses. Thus, all the details as regards the thermoplastic elastomer of the first embodiment are applied equally to the second counterpart of the second embodiment.

In the second-embodied hose the first thermoplastic elastomer for use in forming the outer wall of the core differs from the second counterpart for cover formation only in that this former elastomer may contain, in addition to an EPDM rubber and a butyl-based rubber, an acrylonitrile-butadiene or NBR rubber as the disperse phase. The NBR rubber is a random copolymer of acrylonitrile with butadiene, the acrylonitrile content being preferably in the range of 15 to 45%. The random copolymer used herein may be incorporated with a different component such as divinyl benzene, vinyl pyridine, acrylic acid or the like.

The first thermoplastic elastomer eligible for the invention is similar to the second counterpart in respect of the details of resin-rubber proportions, particle sizes, continuous-disperse configurations, preparation methods by dynamic vulcanization and vulcanizing agents.

The first thermoplastic elastomer thus available when abundant in the NBR rubber is highly moisture-proof, heat aging-resistant, weather-resistant, flexible and retentive of physical qualities. Even when not rich in the NBR rubber, it is physically acceptable except for moisture proofness and weathering resistance. Commercial equivalents to such elastomer are Monsanto's Santoprene and DSM's Kelprox, both products being composed of polypropylene as a thermoplastic resin and EPDM as a rubber component and subjected to dynamic curing, Exxon's Trefsin resulting from dynamically curing a blend of propylene with EPDM and Cl-IIR and Montanto's Diolast which is a dynamic vulcanizate of propylene and NBR.

The polyamide-based composition for the formation of the inner wall of the core may be blended at will with inorganic fillers, pigments, plasticizers, antioxidants and the like. Various other additives may be incorporated in the composition mainly of the first thermoplastic elastomer used to form the outer wall of the core, and they include softeners, inorganic fillers, pigments, plasticizers, antioxidants and the like. The additives mentioned in connection with the first-embodied hose are those employed in the polymer alloy-based composition for use in forming the outer wall of the core and in the composition predominantly of the second thermoplastic elastomer for cover formation.

The reinforcing layer of the second-embodied hose is made up in the same manner as is in the first-embodied hose.

According to a modified form of the second-embodied hose, the core is assembled with an inner peripheral wall formed from a polymer alloy-based composition and an outer peripheral wall formed from a thermoplastic elastomer-based composition. Both compositions used in this modified hose are the same as those utilized and specified in forming the outer wall of the core in the second-embodied hose. Other details of the second-embodied hose are followed in building up the reinforcement and cover in the modified construction.

The thickness of the inner wall of the core ranges from 0.05 to 0.80 mm in the second-embodied hose and from about 0.05 to 2.0 mm, preferably from about 0.20 to 1.5 mm, in the modified hose.

To suit particular applications, the second-embodied and modified hoses may be constructed with a core of a multi-layered structure or with a barrier layer against stress crack.

The second-embodied hose is advantageously producible without vulcanization. For instance, a polyamide-based composition is extruded over a release-treated mandrel with use of an extruder, thereby forming a resinous tube as an inner peripheral wall on the mandrel. The tube-carrying mandrel is passed through an extruder from which a polymer alloy-based composition or a first thermoplastic elastomer-based composition is extruded as an outer peripheral wall over the inner wall on the mandrel. Prior to extrusion of the outer wall, the inner wall may if necessary be coated or sprayed with an adhesive such as of a rubber chloride, phenol resin, HRH or urethane type. The inner wall may be adhesively put into an outer wall previously formed.

The outer wall after being adhesion-treated is braided over its outer periphery with a fibrous reinforcing material by means of a braiding machine. Adhesion treatment is done around the braided reinforcement over which a second thermoplastic elastomer-based composition is extruded on an extruder so as to form a cover. Finally, the mandrel is pulled out of the resulting laminate so that there is obtained a double-cored hose according to the second embodiment.

Adhesives for use on the outer wall and reinforcing layer may be of an isocyanate, phenol resin, resorcinol or urethane type. The urethane adhesive is particularly convenient.

The modified hose of the second embodiment may be produced devoid of vulcanization. Around a release-treated mandrel is extruded a polymer alloy-based composition on an extruder so that an inner peripheral wall is formed on the mandrel. A first thermoplastic elastomer-based composition is laminated as an outer peripheral wall over the inner wall while the mandrel is being passed through an extruder. A reinforcement is braided and a cover laminated as in the second-embodied hose. By subsequent removal of the mandrel, a modified hose is provided as desired. In this instance the inner and outer walls and reinforcing layer may be likewise adhesion-treated.

Although the second-embodied and modified hoses have been described as produced by the use of a mandrel, they are obtainable in a mandrel-free manner except that dimensional accuracy is necessary. Both hoses are not shrinkable with heat or deformable under pressure as on vulcanization and hence dimensionally stable.

The following examples are given to further illustrate the invention.

Figure 2:
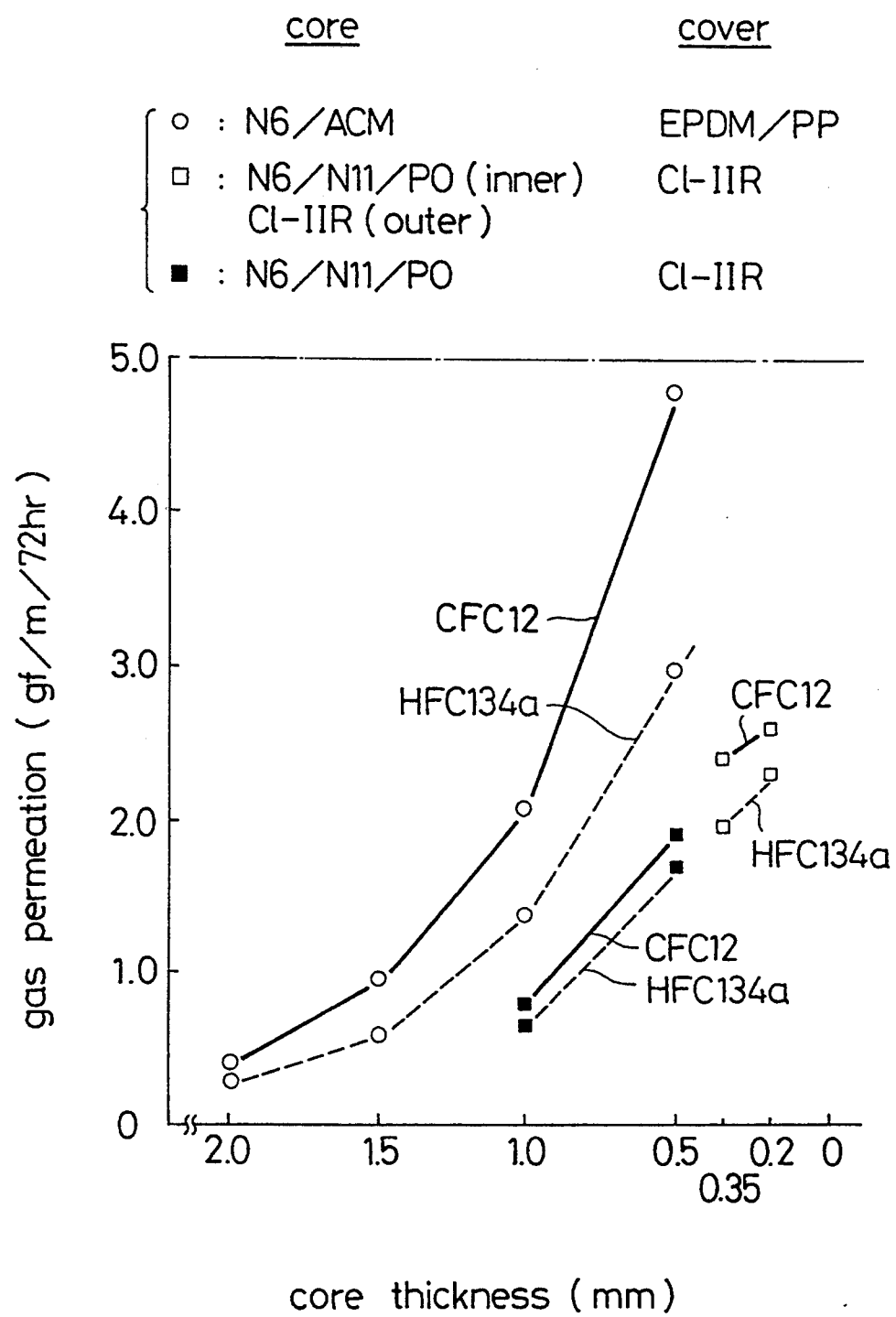
FIGS. 2 and 3 each are views similar to FIG. 1 but explanatory of the correlation between the gas permeation and the core thickness.
Figure 3:
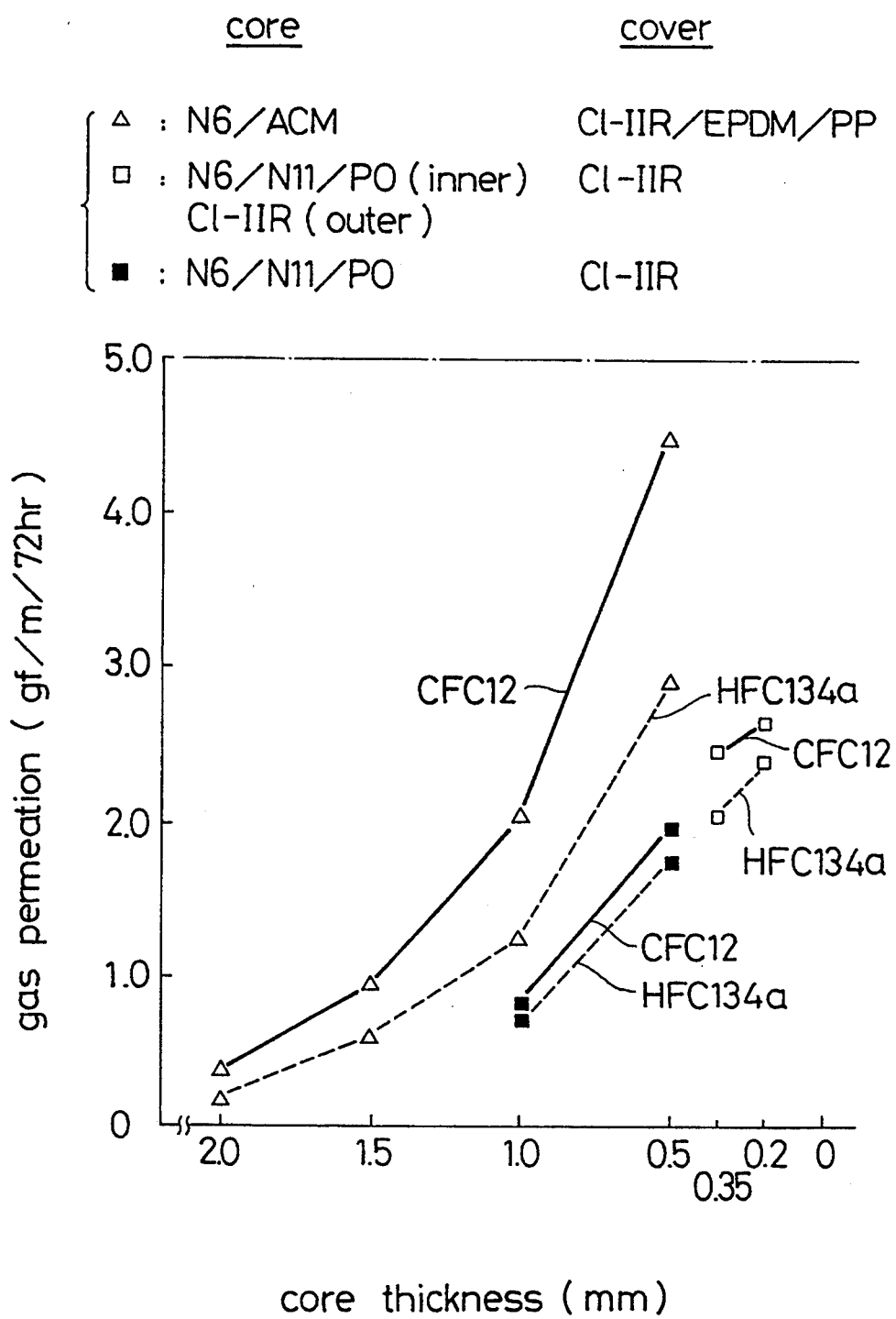

Many different hoses of 11 mm in inside diameter were produced as formulated in Table 1 and by the methods indicated below. Inventive Examples 1 to 12 were directed toward the first embodiment of the invention. All the test hoses were checked for performance and material characteristics under the conditions given hereunder and with the results shown in Tables 1 and 2 and FIGS. 1 to 3.

Inventive Examples 1 to 12 Comparative Example 1

(a) A core was formed by extruding a graft polymer alloy of N6 and ACM into a tubular shape on an extruder.

(b) A urethane adhesive (Lord's Chemlock EP 4802-36) was coated around the core.

(c) Over the adhesion-treated core was disposed a reinforcing layer by braiding fibrous polyester (Toray's Tetron, 1500 d/2) or fibrous rayon (AKZO, 1650 d/2).

(d) The reinforcing layer was treated on its outer surface with a similar adhesive.

(e) A cover was laminated over the reinforcing layer by extrusion of a thermoplastic elastomer (Inventive Examples 1 to 12) and a thermoplastic resin (Comparative Example 1) with use of an extruder.

Comparative Examples 2 and 3

(a) A blend of N6-N11-PO was extruded on to a release-treated mandrel on a resin extruder to thereby an inner peripheral wall on the mandrel.

(b) On a rubber extruder a Cl-IIR-based composition was extruded as an outer peripheral wall over the inner wall on the mandrel so that a double-layered core was formed.

(c) Over the outer wall was disposed a reinforcement by braiding fibrous polyester dip-treated with RFL (Toray's Tetron 1500 d/2, heatset stretch, ±0% at 215° C.).

(d) A cover was laminated around the reinforcement by extrusion of a Cl-IIR-based composition on a rubber extruder.

(e) The resulting laminate after being wrapped with a cloth ribbon-type wrapper was steam-vulcanized under pressure at 160° C. for one hour.

(f) Subsequently, the wrapper was stripped off and the mandrel pulled off.

Comparative Examples 4 and 5

The method of Comparative Examples 2 and 3 was followed except that an N6-N11-PO resin was extruded to form a single-layered core.

Comparative Example 6

The method of Comparative Examples 2 and 3 was followed except that a single-layered core was formed by extrusion of an NBR composition and a cover by extrusion of a CR rubber composition.

Performance Characteristics

1. Flexibility

Bending strength is measured by bending a test hose along a circular arc with a given range of radia. Determination (n=2) is made initially from a 10-fold radius (10 D) of an outside diameter of the hose and eventually to a 3-fold radius. As a flexibility factor a reading is done at a 4-fold radius from a curve in which the bending strength has been plotted against the bending radius.

The hose of the prior art is usually at a flexibility level of 2.0 kgf. Any one among various other hoses made up of a resinous core is known to be 6 to 7 kgf at that level. Such a hose is poor in handling for interfitting with the corresponding system for example in a limited engine room in motor cars. To facilitate handling, the magnitude of bending strength has been found to be acceptable at below 3.5 kgf.

The vibration absorption of a hose is also correlative with its flexibility but in a non-linear manner. Above 3.5 kgf in bending strength causes a sharp rise in reaction force, leading to insufficient vibration absorption. The bending strength of the hose should therefore be smaller than 3.5 kgf, preferably below 2.0 kgf.

2. Gas Impermeation

JRA 2001 is followed which has been stipulated by the Refrigeration and Air-Conditioning Institute of Japan.

A 45-cm long hose provided at both ends with metal joints is charged with a coolant, CFC 12 or HFC 134a, in an amount of $0.6 \pm 0.1$ g/cm$^3$ hose, followed by standing at 100° C. for 96 hours. Weight losses or gas leaks are measured between 24 and 96 hours and converted to a unit of gf/m/72 hr.

The prior hose has a gas leak of CFC 12 of 20 to 25 gf/m/72 hr with a gas exchange cycle of nearly 2 years. A 10-year cycle of gas replacement is necessary for maintenance-free transport. The gas leak should be less than 5 gf/m/72 hr regardless of the kind of gases.

3. Moisture Proofness

A dessicant, molecular sieve 3A, is put in a volume equivalent to 80% of the hose volume into a hose having been left in an oven at 50° C. for 5 hours. The hose after being sealed is allowed to stand at a temperature of 50° C. and at a relative humidity of 95%. The dessicant weight is measured every 120 hours and up to 400 hours and converted to a value of mgf/cm$^2$/day. Moisture permeations of less than 0.2 mgf/cm$^2$/day are acceptable.

4. Air Tightness

A joint-fitted hose is heat-aged at 100° C. for 336 hours and then cooled at room temperature, followed by standing in water and by subsequent application of an internal pressure of 40 kgf/cm$^2$. Air leakage is inspected with naked eye.

Material Characteristics

Test specimens were prepared by individually extruding, into a tubular shape of 11 mm in inside diameter and of 1 mm in thickness, the resinous and rubbery materials used for hose formation.

Vulcanization was effected at 160° C. for one hour in the case of use of a Cl-IIR-based composition and at 150° C. for one hour in the case of use of an NBR-based composition and a CR-based composition.

1. Tensile Elasticity

The specimen is cut into a 5-mm wide strip and then allowed to draw a stress-strain curve on an autograph in an environment at 20° C. Tensile elasticity is counted from an initial inclination on that curve.

2. Retention of Tensile Elasticity

The procedure of item 1 is followed except that the environment is changed at 120° C. Counted is a ratio of an tensile elasticity at 120° C. to that at 20° C.

3. 50% Modulus

A dumb-bell test piece of JIS No. 3 is stamped from the specimen. JIS K-6301 is followed in measuring $M_{50}$ at 20° C.

4. Retention of 50% Modulus $M_{50}$ at 120° C. is determined as is in item 3 and by the JIS K-6301 procedure. Counted is a ratio of 50% moduli both at 120° C. and at 20° C.

5. Gas Permeation

Figure 10:
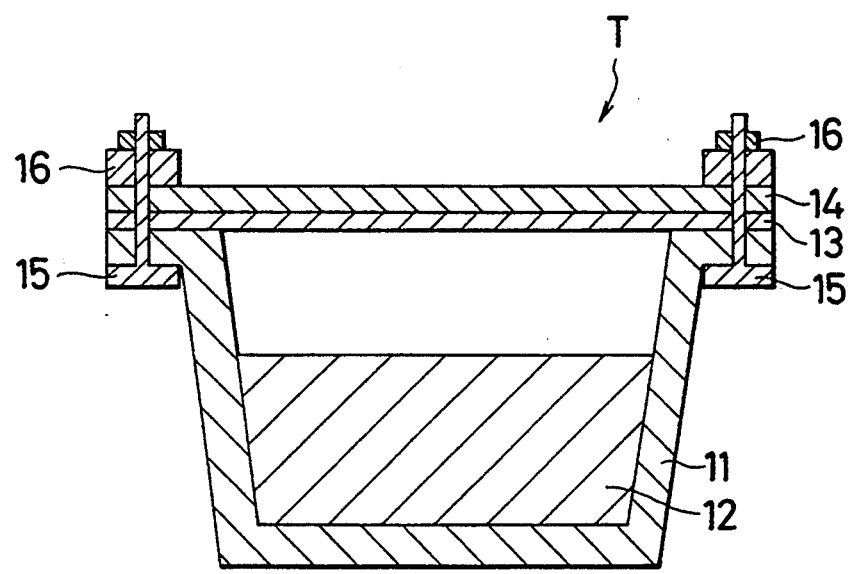
FIG. 10 is a diagrammatic view taken longitudinally sectionally of a gas permeation tester employed in the examples described later.

A tester T is used as shown in FIG. 10. Into a stainless steel cup 11 is put a coolant 12, CFC 12 or HFC 134a, in half a volume of the cup. Mounted atop the cup is a specimen 13 cut in sheet-like form on which is disposed a sintered metal plate 14. Both the plate and the specimen are held in secured relation to the cup by means of bolts 15 and nuts 16.

The tester is let to stand in an atmosphere at 100° C. and measured in its total weight every 24 hours, whereby weight looses are examined. Gas permeability is counted from the following equation.

$$\text{gas permeability (gf/mm/24 hr cm}^2\text{)} = Mt/TA$$

A (cm$^2$): permeation area
T (day): test duration
M (gf): weight loss
T (mm): specimen thickness 6. Moisture Permeation Moisture permeability is counted by the procedure of item 5 except that water is used in place of the coolant gas and in an atmosphere at 80° C.

Test Evaluation

A. Material Characteristics (Table 2)

A-1) The inventive polyamide-acrylic rubber alloy (N6-ACM) (DuPont's ETP 65) used for core formation in the invention has been found smaller in tensile elasticity by 60% than an N6-N11-PO resin (a 58.2–14.5–27.3 ratio) as taught in Japanese Patent Laid-Open Publication No. 63-125885. Such alloy, therefore, is highly flexible and moreover fully retentive of elasticity as high as 38% at 120° C. and hence rather akin to vulcanized rubber. Though substantially comparable in moisture permeation to that blend, such inventive alloy is superior in gas impermeability.

A-2) The inventive thermoplastic elastomers for cover formation (EPDM and Cl-IIR-EPDM-PP) are adequate in flexibility and akin to vulcanized rubber in $M_{50}$ at 120° C. Such elastomers are smaller in permeation resistance to gas and to moisture than N6-ACM and N6-N11-PO. Taking HFC 134a impermeability and moisture proofness in view, however, Trefsin (Cl-IIR-EPDM-PP) bears a close resemblance to vulcanized butyl-based rubber, whereas Santoprene (EPDM-PP) is similar in moisture proofness to that vulcanized rubber.

B. Hose Characteristics (Table 1 and FIGS. 1 to 3)

B-1) Flexibility, Gas Impermeation and Moisture Proofness

B-1-1) Inventive Examples 1 to 4

The hoses of an N6-ACM core and an EPDM-PP cover are highly satisfactory in respect of the test characteristics.

The bending strength of a hose is closely associated with its core thickness. Above 2.0 mm would lead to too great bending strength. Gas impermeability is also dominated by the core thickness. Below 0.5 mm would render the resultant hose relatiely permeable to CFC 12 but sufficiently resistant to HFC 134a.

B-1-2) Inventive Examples 5 to 8

The hoses of an N6-ACM core and a Cl-IIR-EPDM-PP cover are all acceptable in the test qualities. The core thickness should not be more than 2.0 mm so as to attain the targeted flexibility. While gas impermeability varies with the core thickness, Inventive Examples 5 to 8 are slightly superior to Inventive Examples 1 to 4.

B-1-3) Inventive Examples 3, 7, 9 and 11

These hoses have assembled a rayon-braided reinforcement in place of a polyester-braided one. Both reinforcements make no substantial difference to the test qualities.

B-1-4) Inventive Examples 9 to 12

These hoses have a cover of varied thickness, 2.0 or 1.0 min. A cover of reduced thickness renders both flexibility and gas impermeability rather variable but to an acceptable extent.

B-1-5) Comparative Example 1

A core is formed of N6-ACM and a cover of ETFE known to be a gas-impermeable, moisture-proof thermoplastic resin. Production is made possible without vulcanization. Such comparative hose exhibits improved impermeation to gas and to moisture but result in reduced flexibility from the inherent hardness of ETFE. Another drawback is that the ETFE cover tends to soften on exposure to high temperature, leading to air leakage.

B-1-6) Comparative Examples 2 and 3

A double-layered core is assembled with an inner peripheral wall of N6-N11-PO and an outer peripheral wall of Cl-IIR. Although acceptable in the test qualities, these comparative hoses are producible with need of vulcanization and with resort to many process steps and hence only in an expensive manner. Because the resinous material is formed in a relatively small thickness, a mandrel is needed in processing that resin.

B-1-7) Comparative Example 7

This hose is of a conventional type with an NBR core and a CR cover and undesirable for coolant transport.

B-2) Air Tightness

B-2-1) Inventive Examples 1 to 12

These hoses are all free from air leak due presumably to the core being fully retentive of tensile elasticity at 120° C.

B-2-2) Comparative Examples 1, 4 and 5

A cover is formed of ETFE and a core of N6-N11-PO. These resins are not sufficient in physical retention at high temperature.

Different hoses of 11 mm in inside diameter were produced as formulated in Table 3 and by the method given hereunder. Inventive Examples 13 to 30 were provided in accordance with the second embodiment of the invention.

Figure 4:
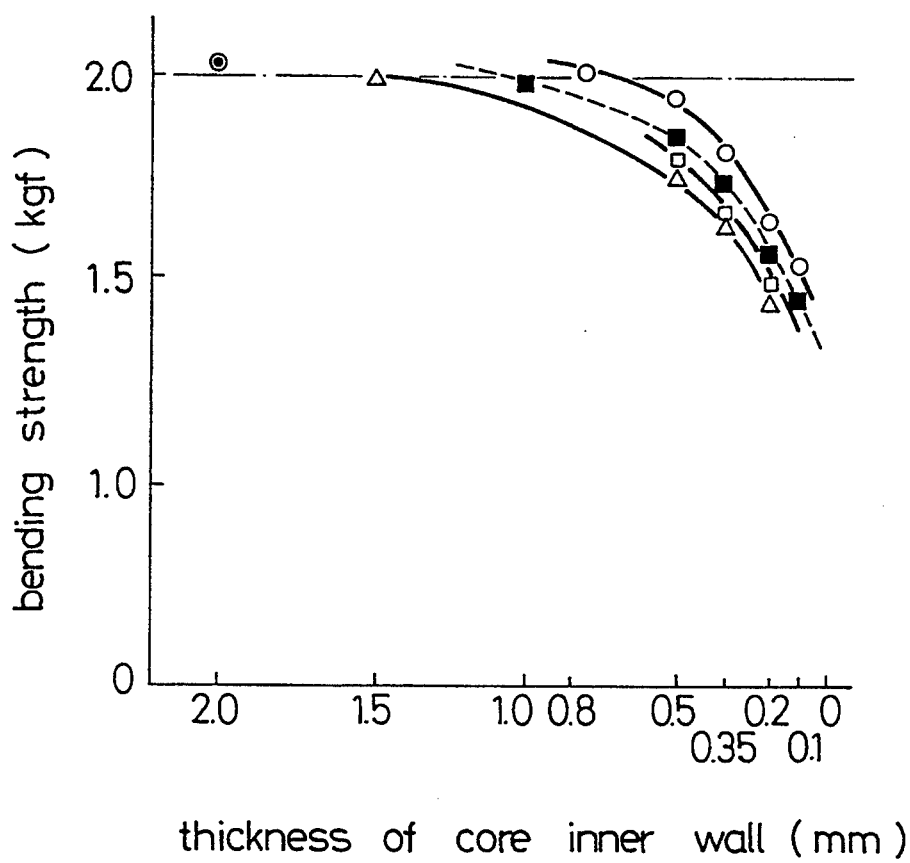
FIG. 4 graphically represents the hose according to a second embodiment of the invention, showing the bending strength as plotted against the thickness of the core inner wall.
Figure 5:
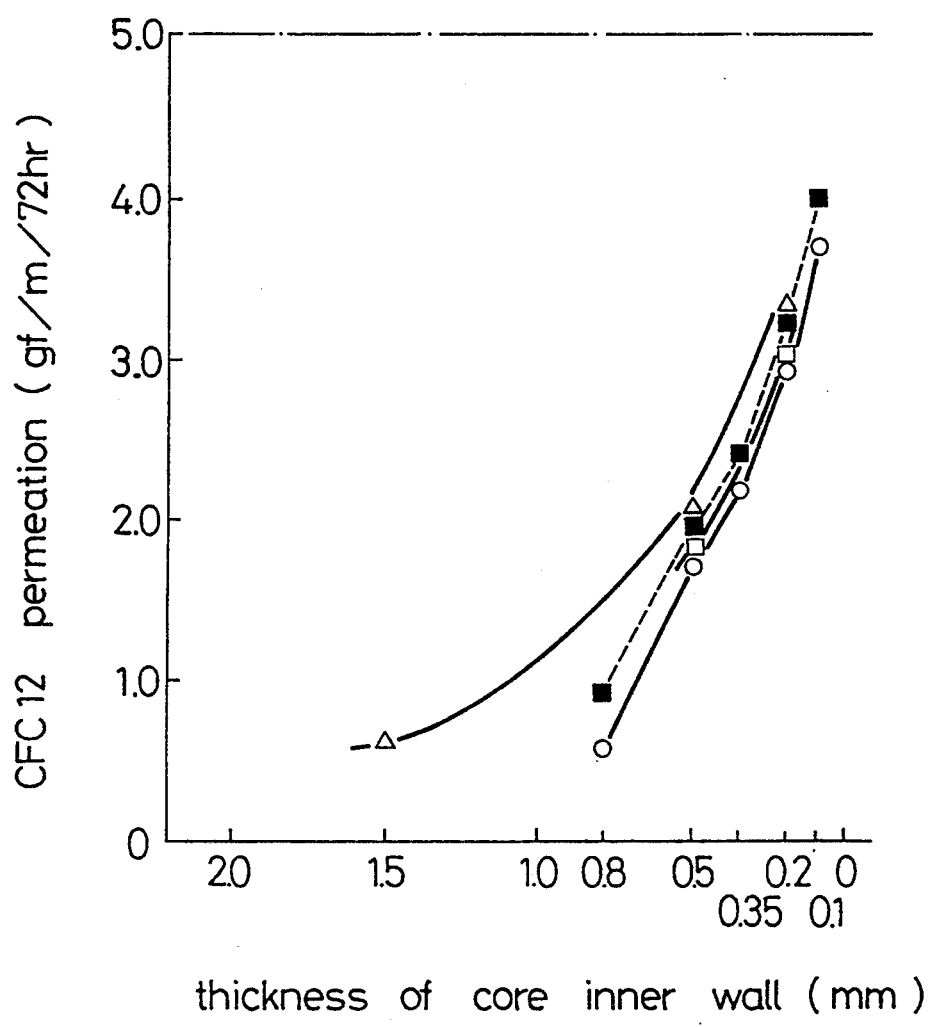
FIGS. 5 and 6 each are views similar to FIG. 4 but illustrative of the correlation between the gas permeation and the thickness of the core inner wall.
Figure 6:
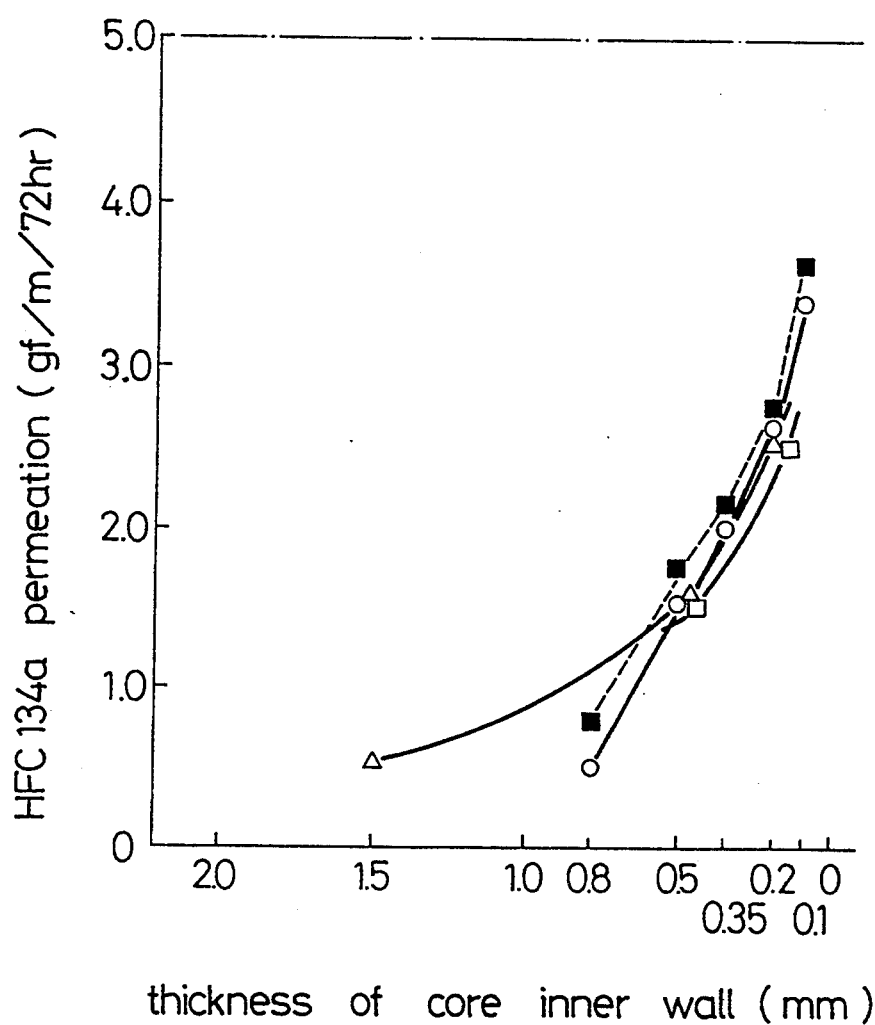

Performance evaluation was made of all the test hoses and also of their constituent materials under the conditions indicated below and with the results shown in Tables 3 and 4 and FIGS. 4 to 6.

Inventive Examples 13 to 30/Comparative Examples 7 to 9

(a) An N6-N11-PO blend was extruded on to a release-treated mandrel on a resin extruder, thereby forming an inner peripheral wall of a core on the mandrel.

(b) A urethane adhesive (Lord's Chemlock EP 4802-36) was coated on to the inner wall.

(c) On a resin extruder an N6-ACM alloy or an EPDM-PP or Cl-IIR-EPDM-PP elastomer was extruded over the inner wall so that an outer peripheral wall was laminated around the inner wall.

(d) The outer wall was coated with a similar urethane adhesive.

(e) Over the outer wall a reinforcement was disposed by braiding fibrous polyester (Toray's Tetron, 1500 d/2 ).

(f) A similar urethane adhesive was applied on to the reinforcement.

(g) A cover was laminated over the reinforcement by extrusion of a Cl-IIR-EPDM-PP or EPDM-PP elastomer (Inventive Examples 13 to 30) or an NBR-PP elastomer (Comparative Examples 7 to 9).

(h) Finally, the mandrel was pulled out of the laminate.

Performance Characteristics

Several physical properties, namely flexibility, gas impermeation, moisture proofness and air tightness, are determined as are in Inventive Examples 1 to 12.

Further evaluation is made of ozone resistance by the JIS K-6330 procedure. A test specimen is wound around a cylindrical member of an 8-fold outside diameter of the outside diameter of a hose, followed by standing in a constant atmosphere. The ozone concentration is 50 pphm and the temperature at 40° C. Cracking is inspected every 24 hours and up to 168 hours. This quality is adjudged by the length of time required for a crack to take place. No cracks at the 168th hour are taken as acceptable.

Material Characteristics

To prepare test specimens, the resinous and rubbery materials used for hose formation were extruded individually into a tubular shape of 11 mm in inside diameter and of 1 mm in thickness.

The procedures of the Inventive Examples 1 to 12 are followed in evaluating tensile elasticity, retention of tensile elasticity, 50% modulus, retention of 50% modulus, gas impermeation and moisture proofness.

Test Evaluation

1. Flexibility

Smaller bending strengths than 3.5 kgf are acceptable and below 2.0 kgf more preferable.

Flexibility is variable more with the thickness of an inner wall of the core than with the parameters, tensile elasticity and $M_{50}$, of an outer wall of the core and of the cover. With an inner wall of the core of smaller than 1.5 mm in thickness, preferably less than 0.8 mm, the inventive hoses are sufficiently flexible regardless of the materials of the outer wall and of the cover.

2. Gas Impermeation

Impermeation to CFC 12 and HFC 134a for hose performance is acceptable at below 5 gf/m/72 hr at 100° C.

This quality is governed by the thickness of an N6-N11-PO resin used to form an inner wall of the core rather than the materials of the core outer wall and cover. Inner walls of greater than 0.05 mm in thickness are effective in inhibiting both gases against leak. CFC 12 is more leakable than HFC 134a. To ensure resistance to gas permeation, the core preferably has an inner wall of more than 0.1 mm in thickness.

3. Moisture Proofness

Below 0.2 mgf/cm$^2$/day is acceptable for hose performance.

The inventive hoses are all adequate in this quality. A hose with an outer wall of NBR/PP and a cover of NBR/PP is unacceptably moisture-permeable (Comparative Example 9). This is attributable to the NBR/PP elastomer being inherently less resistant to moisture permeation.

4. Air Tightness

When a hose is made with use of thermoplastic resins in place of rubbers and without need of vulcanization, concern arouses that it may cause plastic deformation and hence air leak. To prevent such likely malfunction, the inventive hoses are structured to incorporate the stress-retentive materials specified above.

5. Ozone Resistance

The inventive hoses are sufficiently ozone-resistant. An NBR/PP cover is susceptible to cracking probably due to the peculiar nature of NBR (Comparative Examples 7 to 9).

The hoses according to the invention have a core inner wall ranging in thickness from 0.05 to 2.00 mm and thus excel in flexibility and gas impermeation. Moisture proofness and ozone resistance are improved by the use of a cover formed from a thermoplastic elastomer of EPDM and butyl-based rubbers. The thickness of the inner wall is preferably greater than 0.05 mm also in view of that wall being liable to faults such as scars.

Figure 7:
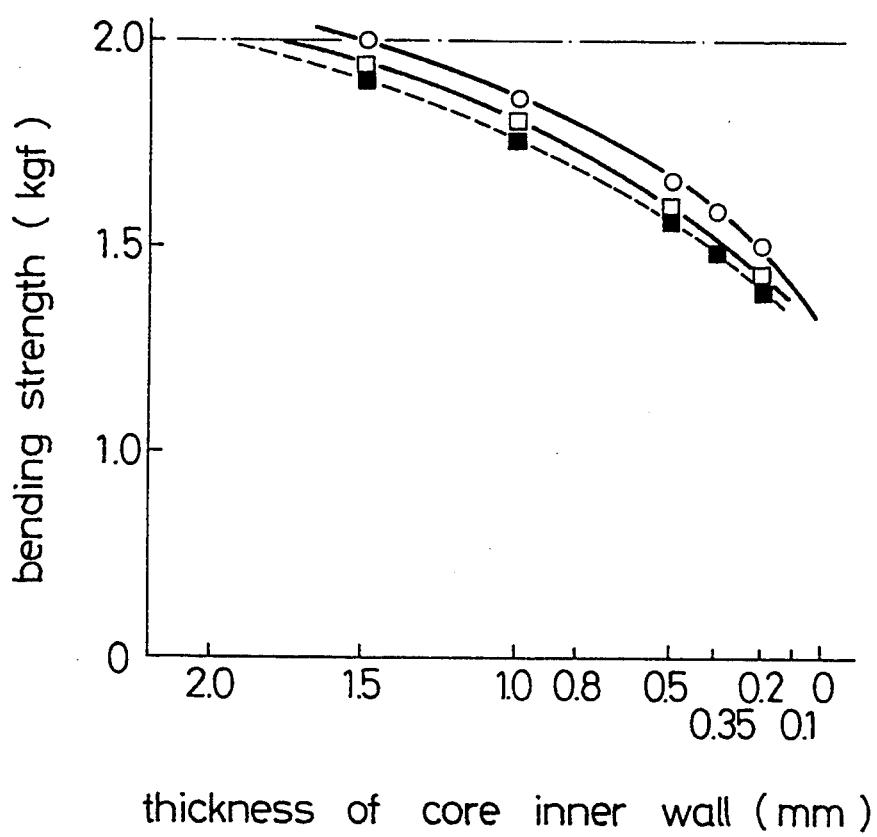
FIG. 7 illustrates the modified hose of the second embodiment, showing the bending strength as plotted against the thickness of the core inner wall.
Figure 8:
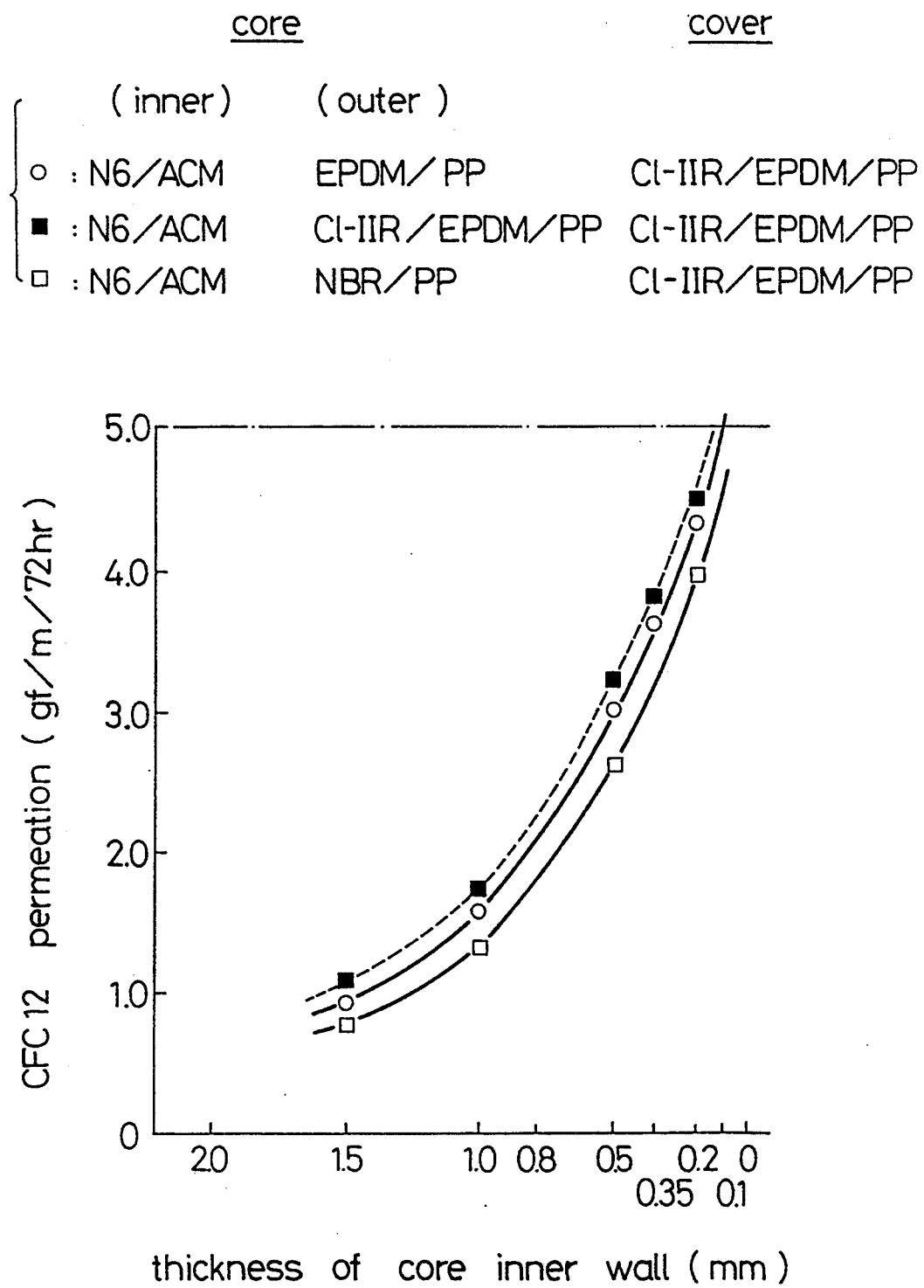
FIGS. 8 and 9 each are views similar to FIG. 7 but explanatory of the correlation between the gas permeation and the thickness of the core inner wall.
Figure 9:
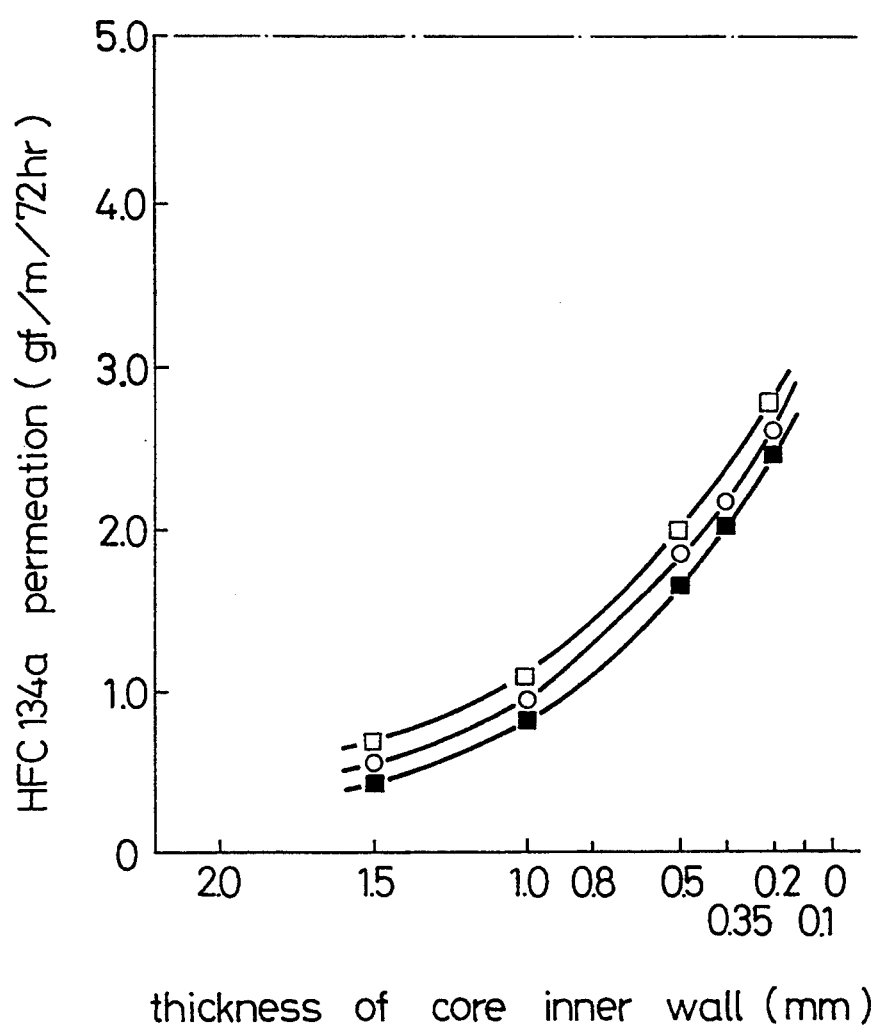

As listed in Table 5, different hoses of 11 mm in inside diameter were produced according to the second embodiment modified. Performance evaluation was made as in Inventive Examples 13 to 30 and with the results shown in Tables 5 and 6 and FIGS. 7 to 9.

Inventive Examples 31 to 47

The method of Inventive Examples 13 to 30 was followed except for certain modifications made. An N6-ACM alloy was used to form an inner peripheral wall of a core, whereas an EPDM-PP, Cl-IIR-EPDM-PP or NBR-PP elastomer was used for formation of an outer peripheral wall. A cover was formed from a Cl-IIR-EPDM-PP or EPDM-PP elastomer.

Comparative Example 10

(a) On a resin extruder an N6-N11-PO resin was extruded into a tubular shape to thereby form a core of a single-layered structure.

(b) The core was coated with a urethane adhesive (Lord's Chemlock EP 4802-36).

(c) Around the adhesion-treated core was braided as a reinforcement fibrous polyester (Toray's Tetron, 1500 d/2).

(d) A similar adhesive was applied on to the reinforcement.

(e) A cover was laminated over the reinforcement by extrusion of ETFE on a resin extruder.

Comparative Examples 11 and 12

(a) With use of a resin extruder an N6-N11-PO blend was extruded on to a release-treated mandrel to form thereon an outer peripheral wall of a core.

(b) Over the inner wall was laminated an outer peripheral wall by extrusion of Cl-IIR on a rubber extruder.

(c) A reinforcement was disposed around the outer wall by braiding fibrous polyester RFL-treated (Toray's Tetron, 1500 d/2, heatset stretch, ±0% at 215° C.).

(d) A cover was laminated over the reinforcement by extrusion of Cl-IIR by means of a rubber extruder.

(e) Steam vulcanization was effected at 160° C. for one hour.

(f) The mandrel was pulled out of the vulcanizate.

Comparative Examples 13 and 14

The method of Comparative Examples 11 and 12 was followed except that the core was formed into a single-layered structure and the adhesion omitted.

Comparative Example 15

The method of Comparative Examples 13 and 14 was followed except that the core was formed from NBR and the cover from CR and that the vulcanization was carried out at 150° C.

Material Characteristics

The materials used for hose formation were extruded into a tubular shape of 11 mm in inside diameter and of 1 mm in thickness, thereby preparing test specimens. A Cl-II$^R$ specimen was vulcanized at 160° C. for one hour after extrusion and NBR and CR specimens at 150° C. for one hour.

The physical properties of the specimens were examined as in Inventive Examples 13 to 30.

Performance Characteristics

1. Flexibility

This quality depends widely upon the thickness of a core inner wall. The N6-ACM alloy useful in Inventive Examples 31 to 47 is more flexible than the N6-N11-PO blend in Inventive Examples 13 to 30. In the case of use of that alloy, the inner wall may be as thick as 2.0 mm with acceptable flexibility. The inner wall thickness is preferably smaller than 1.5 min.

2. Gas Impermeability

To attain sufficient impermeation to gas, an inner wall of the core may have a thickness of greater than 0.1 mm, preferably above 0.2 mm, for use in CFC 12 and of greater than 0.05 mm, preferably above 0.1 mm, for HFC 134a transport.

3. Moisture Proofness

The inventive hoses are all of a moisture-proof structure.

4. Air Tightness

The evaluation of Inventive Examples 13 to 30 applies to the hoses of Inventive Examples 31 to 47.

As appears from the test data, the use of a core inner wall of 0.05 to 2.0 mm in thickness as in the invention renders the resultant hose highly satisfactory in respect of all the test qualities. The thickness of the inner wall is made convenient at above 0.05 mm when scarring on that wall is taken in view.

The hose of Comparative Example 10 is assembled with a core formed from an N6-N11-PO blend and a cover from an ETFE resin known to be relatively impervious to gas and to moisture. This comparative hose is producible without vulcanization and acceptable in gas impermeability and moisture proofness. The ETFE resin, however, is too hard to be adequate in flexibility. Moreover, it tends to soften at elevated temperature and hence fails to retain its physical properties, resulting in air leakage.

In Comparative Examples 11 and 12 the hoses each have a core inner wall of an N6-N11-PO resin, a core outer wall of a Cl-IIR rubber and a cover of a Cl-IIR rubber. Though sufficient in regard to all the test qualities, these hoses are producible only in an uneconomical manner. A mandrel needs to be used in processing the inner wall which is made necessarily relatively small in thickness.

The hoses of Comparative Examples 13 and 14 have a single-layered core of an N6-N11-PO resin and a cover of a Cl-IIR rubber. They reveal air leak as the core has too small a thickness, and moreover such resin has poor retention of its physical properties at high temperature.

Comparative Example 15 shows a conventional hose having an NBR core and a CR cover. This hose is objectionably gas-permeable.

Listed below are the resinous and rubbery materials shown in Tables 1 to 6.

1) graft polymer alloy of polyamide and acrylic rubber (ETP 65, DuPont)
2) thermoplastic elastomer (Trefsin 101-80, Exxon)
3) thermoplastic elastomer (Trefsin 165-70A, Exxon)
4) copolymer of ethylene and tetrafluoroethylene (ETFE)
5) blend of nylon 6, nylon 11 and polyolefin (maleic acid-modified EPDM) (58.2–14.5–27.3)
6) chlorinated butyl rubber composition

| | |
|---|---|
| Cl-IIR (Chlorobutyl 1066, Exxon) | 100 phr |
| carbon black (No. 50, Asahi Carbon) | 80 |
| stearic acid | 2 |
| antioxidant (Antage OD, Kawaguchi Chemical) | 2 |
| softener (Machine Oil 22, Fuji Kosan) | 5 |
| magnesium oxide | 1 |
| zinc oxide | 5 |
| accelerator TS (Sunceller MSPO, Sanshin Chemical) | 2 |

7) acrylonitrile-butadiene rubber composition

| | |
|---|---|
| NBR (Nipol DN 005, Nippon Zeon) | 100 phr |
| carbon black (No. 50, Asahi Carbon) | 80 |
| zinc oxide | 5 |
| stearic acid | 1 |
| antioxidant (Antage OD, Kawaguchi Chemical) | 1 |
| plasticizer (DOP, Chisso Petrochemical) | 10 |
| sulfur | 2 |
| accelerator TS (Sunceller MSPO, Sanshin Chemical) | 1 |

8) chloroprene rubber composition

| | |
|---|---|
| CR (Neoprene W, Showa Neoprene) | 100 phr |
| stearic acid | 1 |
| magnesium oxide | 4 |
| antioxidant (Antage OD, Kawaguchi Chemical) | 2 |
| carbon black (No. 50, Asahi Carbon) | 60 |
| softener (Fuccol 1150N, Fuji Kosan) | 10 |
| zinc oxide | 5 |
| accelerator TS (Sunceller MSPO, Sanshin Chemical) | 0.75 |

9) thermoplastic elastomer (Diolast 701-80, Monsanto)

TABLE 1

| Structure/Performance | Inventive Examples | | | | | | | |
|---|---|---|---|---|---|---|---|---|
| | 1 | 2 | 3 | 4 | 5 | 6 | 7 | 8 |
| hose structure | | | | | | | | |
| core   inner wall | 1) N6/ACM | 1) N6/ACM | 1) N6/ACM | 1) N6/ACM | 1) N6/ACM | 1) N6/ACM | 1) N6/ACM | 1) N6/ACM |
| thickness (mm) | 2.0 | 1.5 | 1.0 | 0.5 | 2.0 | 1.5 | 1.0 | 0.5 |
| outer wall | — | — | — | — | — | — | — | — |
| thickness (mm) | — | — | — | — | — | — | — | — |
| reinforcement | ← polyester → | | | | | | | |
| cover/thickness (mm) | 2) EPDM/PP | 2) EPDM/PP | 2) EPDM/PP | 2) EPDM/PP | 3) Cl-IIR/ EPDM/PP | 3) Cl-IIR/ EPDM/PP | 3) Cl-IIR/ EPDM/PP | 3) Cl-IIR/ EPDM/PP |
| | 2.0 | 2.0 | 2.0 | 2.0 | 2.0 | 2.0 | 2.0 | 2.0 |
| vulcanization | ← not effected → | | | | | | | |
| mandrel | ← not used → | | | | | | | |
| hose performance | | | | | | | | |
| flexibility (kfg) | 1.95 | 1.82 | 1.70 | 1.43 | 1.91 | 1.76 | 1.61 | 1.38 |
| gas permeation (gf/m/72 hr) | | | | | | | | |
| CF 12 | 0.43 | 0.98 | 2.08 | 4.80 | 0.39 | 0.92 | 2.00 | 4.71 |
| HFC 134a | 0.26 | 0.62 | 0.31 | 2.91 | 0.23 | 0.59 | 1.24 | 2.81 |
| moisture permeation ($mgf/cm^2/day$) | 0.16 | 0.16 | 0.18 | 0.18 | 0.15 | 0.15 | 0.17 | 0.17 |
| air tightness | ← not leaked → | | | | | | | |

TABLE 1-continued

| Structure/ | Inventive Examples | | | | Comparative Examples | | | | | |
|---|---|---|---|---|---|---|---|---|---|---|
| Performance | 9 | 10 | 11 | 12 | 1 | 2 | 3 | 4 | 5 | 6 |
| hose structure | | | | | | | | | | |
| core inner wall | 1) N6/ACM | 1) N6/ACM | 1) N6/ACM | 1) N6/ACM | 1) N6/ACM | 5) N6/N11/PO | 5) N6/N11/PO | 5) N6/N11/PO | 5) N6/N11/PO | — |
| thickness (mm) | 1.0 | 1.0 | 1.0 | 1.0 | 1.0 | 0.2 | 0.35 | 0.5 | 1.0 | — |
| outer wall | — | — | — | — | — | Cl-IIR [6] | Cl-IIR [6] | — | — | NBR [7] |
| thickness (mm) | — | — | — | — | — | 1.8 | 1.65 | — | — | 2.0 |
| reinforcement | ← rayon → | | | | | | ← polyester → | | | |
| cover/thickness (mm) | 2) | 2) | 3) | 3) | 4) | 6) | 6) | 6) | 6) | 8) |
|  | EPDM/PP | EPDM/PP | Cl-IIR/EPDM/PP | Cl-IIR/EPDM/PP | ETFE | Cl-IIR | Cl-IIR | Cl-IIR | Cl-IIR | CR |
|  | 2.0 | 1.0 | 2.0 | 1.0 | 1.0 | 2.0 | 2.0 | 2.0 | 2.0 | 2.0 |
| vulcanization | ← not effected → | | | | | | ← effected → | | | |
| mandrel | ← not used → | | | | | | ← used → | | | |
| hose performance | | | | | | | | | | |
| flexibility (kfg) | 1.73 | 1.69 | 1.89 | 1.74 | 4.12 | 1.57 | 1.74 | 1.82 | 2.10 | 1.90 |
| gas permeation (gf/m/72 hr) | | | | | | | | | | |
| CFC 12 | 2.06 | 2.13 | 2.00 | 2.08 | 1.80 | 2.60 | 2.43 | 1.94 | 0.76 | 22 |
| HFC 134a | 1.32 | 1.35 | 1.23 | 1.29 | 1.95 | 2.35 | 2.12 | 1.74 | 0.68 | 35 |
| moisture permeation (mgf/cm$^2$/day) | 0.16 | 0.18 | 0.16 | 0.17 | 0.20 | 0.10 | 0.10 | 0.16 | 0.14 | 0.60 |
| air tightness | ← not leaked → | | | | leaked | ← not leaked → | | ← leaked → | | not leaked |

TABLE 2

| | core | | | cover | | | | |
|---|---|---|---|---|---|---|---|---|
| Material Property | 1) N6/ACM | 5) N6/N11/PO | 7) NBR | 2) EPDM/PP | Cl-IIR/EPDM/PP | 4) ETFE | 6) Cl-IIR | 8) CR |
| 9 tensile elasticity (kgf/cm$^2$) | 1600 | 3850 | — | — | — | 5200 | — | — |
| retention of tensile elasticity at 120° C. (%) | 38 | 19 | — | — | — | 14 | — | — |
| $M_{50}$ (kgf/cm$^2$) | — | — | 62 | 57 | 26 | — | 18 | 25 |
| retention of $M_{50}$ (%) | — | — | 43 | 37 | 31 | — | 30 | 30 |
| gas permeation (gf mm/24 hr cm$^2$) | | | | | | | | |
| CFC 12 | $7.0 \times 10^{-4}$ | $2.6 \times 10^{-4}$ | $2.4 \times 10^{-3}$ | 0.632 | 0.657 | $3.8 \times 10^{-4}$ | 0.160 | 0.110 |
| HFC 134a | $4.3 \times 10^{-4}$ | $2.4 \times 10^{-4}$ | $5.1 \times 10^{-2}$ | 0.103 | 0.034 | $4.8 \times 10^{-4}$ | 0.013 | 0.025 |
| moisture permeation (gf mm/24 hr cm$^2$) | $9.9 \times 10^{-3}$ | $10.3 \times 10^{-3}$ | $12.3 \times 10^{-3}$ | $5.12 \times 10^{-3}$ | $2.27 \times 10^{-3}$ | $3.1 \times 10^{-3}$ | $1.56 \times 10^{-3}$ | $10.75 \times 10^{-3}$ |
| vulcanization | not effected | ← effected → | | ← not effected → | | | ← effected → | |

TABLE 3

| | Inventive Examples | | | | | | |
|---|---|---|---|---|---|---|---|
| Structure/Performance | 13 | 14 | 15 | 16 | 17 | 18 | 19 |
| hose structure | | | | | | | |
| core inner wall | 5) N6/N11/PO | 5) N6/N11/PO | 5) N6/N11/PO | 5) N6/N11/PO | 5) N6/N11/PO | 5) N6/N11/PO | 5) N6/N11/PO |
| thickness (mm) | 0.1 | 0.2 | 0.35 | 0.5 | 0.8 | 0.1 | 0.2 |
| outer wall | 1) N6/ACM | 1) N6/ACM | 1) N6/ACM | 1) N6/ACM | 1) N6/ACM | 2) EPDM/PP | 2) EPDM/PP |
| thickness (mm) | 1.9 | 1.8 | 1.65 | 1.5 | 1.0 | 1.9 | 1.8 |
| reinforcement | ← polyester → | | | | | | |
| cover/thickness (mm) | 3) Cl-IIR/EPDM/PP | 3) Cl-IIR/EPDM/PP | 3) Cl-IIR/EPDM/PP | 3) Cl-IIR/EPDM/PP | 3) Cl-IIR/EPDM/PP | 3) Cl-IIR/EPDM/PP | 3) Cl-IIR/EPDM/PP |
|  | 2.0 | 2.0 | 2.0 | 2.0 | 2.0 | 2.0 | 2.0 |
| vulcanization | ← not effected → | | | | | | |
| hose performance | | | | | | | |
| flexibility (kgf) | 1.52 | 1.63 | 1.81 | 1.93 | 2.00 | 1.44 | 1.53 |
| gas permeation (gf/m/72 hr) | | | | | | | |
| CFC 12 | 3.70 | 2.84 | 2.21 | 1.74 | 0.61 | 3.91 | 2.95 |

TABLE 3-continued

| | | | | | | | |
|---|---|---|---|---|---|---|---|
| HFC 134a | 3.33 | 2.59 | 1.96 | 1.51 | 0.50 | 3.52 | 2.64 |
| moisture permeation (mgf/cm²/day) | 0.15 | 0.16 | 0.15 | 0.16 | 0.17 | 0.09 | 0.11 |
| air tightness | | | | ← not leaked → | | | |
| ozone resistance (hr) | >168 | >168 | >168 | >168 | >168 | >168 | >168 |

| | Inventive Examples | | | | | | |
|---|---|---|---|---|---|---|---|
| Structure/Performance | 20 | 21 | 22 | 23 | 24 | 25 | 26 |
| hose structure | | | | | | | |
| core inner wall | 5) N6/N11/PO | 5) N6/N11/PO | 5) N6/N11/PO | 5) N6/N11/PO | 5) N6/N11/PO | 5) N6/N11/PO | 5) N6/N11/PO |
| thickness (mm) | 0.35 | 0.5 | 1.0 | 0.2 | 0.5 | 1.5 | 0.2 |
| outer wall | 2) EPDM/PP | 2) EPDM/PP | 2) EPDM/PP | 3) Cl-IIR/EPDM/PP | 3) Cl-IIR/EPDM/PP | 3) Cl-IIR/EPDM/PP | 9) NBR/PP |
| thickness (mm) | 1.65 | 1.5 | 1.0 | 1.8 | 1.5 | 0.5 | 1.8 |
| reinforcement | | | | ← polyester → | | | |
| cover/thickness (mm) | 3) Cl-IIR/EPDM/PP 2.0 | 3) Cl-IIR/EPDM/PP 2.0 | 3) Cl-IIR/EPDM/PP 2.0 | 3) Cl-IIR/EPDM/PP 2.0 | 3) Cl-IIR/EPDM/PP 2.0 | 3) Cl-IIR/EPDM/PP 2.0 | 3) Cl-IIR/EPDM/PP 2.0 |
| vulcanization | | | | ← not effected → | | | |
| hose performance | | | | | | | |
| flexibility (kgf) | 1.72 | 1.83 | 1.96 | 1.43 | 1.74 | 1.99 | 1.48 |
| gas permeation (gf/m/72 hr) | | | | | | | |
| CFC 12 | 2.36 | 1.90 | 0.82 | 3.54 | 2.08 | 0.61 | 2.09 |
| HFC 134a | 2.13 | 1.74 | 0.75 | 2.54 | 1.56 | 0.55 | 2.51 |
| moisture permeation (mfg/cm²/day) | 0.12 | 0.14 | 0.14 | 0.08 | 0.11 | 0.17 | 0.11 |
| air tightness | | | | ← not leaked → | | | |
| ozone resistance (hr) | >168 | >168 | >168 | >168 | >168 | >168 | >168 |

| | Inventive Examples | | | | Comparative Examples | | |
|---|---|---|---|---|---|---|---|
| Structure/Performance | 27 | 28 | 29 | 30 | 7 | 8 | 9 |
| hose structure | | | | | | | |
| core inner wall | 5) N6/N11/PO | 5) N6/N11/PO | 5) N6/N11/PO | 5) N6/N11/PO | 5) N6/N11/PO | 5) N6/N11/PO | 5) N6/N11/PO |
| thickness (mm) | 0.5 | 0.2 | 0.2 | 0.2 | 0.2 | 0.2 | 0.2 |
| outer wall | 9) NBR/PP | 2) EPDM/PP | 3) Cl-IIR/EPDM/PP | 9) NBR/PP | 2) EPDM/PP | 3) Cl-IIR/EPDM/PP | 9) NBR/PP |
| thickness (mm) | 1.5 | 1.8 | 1.8 | 1.8 | 1.8 | 1.8 | 1.8 |
| reinforcement | | | | ← polyester → | | | |
| cover/thickness (mm) | 3) Cl-IIR/EPDM/PP 2.0 | 2) EPDM/PP 2.0 | 2) EPDM/PP 2.0 | 2) EPDM/PP 2.0 | 9) NBR/PP 2.0 | 9) NBR/PP 2.0 | 9) NBR/PP 2.0 |
| vulcanization | | | | ← not effected → | | | |
| hose performance | | | | | | | |
| flexibility (kgf) | 1.79 | 1.66 | 1.54 | 1.64 | 1.58 | 1.52 | 1.56 |
| gas permeation (gf/m/72 hr) | | | | | | | |
| CFC 12 | 1.78 | 2.95 | 3.52 | 2.91 | 2.91 | 3.49 | 1.97 |
| HFC 134a | 1.53 | 2.62 | 2.56 | 2.63 | 2.66 | 2.58 | 2.67 |
| moisture permeation (mfg/cm²/day) | 0.17 | 0.09 | 0.08 | 0.12 | 0.12 | 0.11 | 0.58 |
| air tightness | | | | ← not leaked → | | | |
| ozone resistance (hr) | >168 | >168 | >168 | >168 | 144 | 144 | 144 |

TABLE 4

| | | | core outer wall/cover | | |
|---|---|---|---|---|---|
| Material Property | core inner wall 5) N6/N11/PO | core outer wall 1) N6/ACM | 3) Cl-IIR/EPDM/PP | 2) EPDM/PP | 9) NBR/PP |
| tensile elasticity (kgf/cm²) | 3850 | 1600 | — | — | — |
| retention of tensile elasticity at 120° C. (%) | 19 | 38 | — | — | — |
| $M_{50}$ (kgf/cm²) | — | — | 26 | 57 | 38 |
| retention of $M_{50}$ (%) | — | — | 31 | 37 | 31 |
| gas permeation (gf mm/24 hr cm²) | | | | | |
| CFC 12 | $2.6 \times 10^{-4}$ | $7.0 \times 10^{-4}$ | 0.657 | 0.632 | 0.341 |
| HFC 134a | $2.4 \times 10^{-4}$ | $4.3 \times 10^{-4}$ | 0.034 | 0.103 | 0.163 |
| moisture permeation | $9.9 \times 10^{-3}$ | $9.9 \times 10^{-3}$ | $2.27 \times 10^{-3}$ | $5.12 \times 10^{-3}$ | $18.4 \times 10^{-3}$ |

TABLE 4-continued

| Material Property | core inner wall 5) N6/N11/PO | core outer wall 1) N6/ACM | core outer wall/cover 3) Cl-IIR/ EPDM/PP | 2) EPDM/PP | 9) NBR/PP |
|---|---|---|---|---|---|
| (gf mm/24 hr cm²) | | | | | |
| Vulcanization | ← not effected → | | | | |

TABLE 5

| Structure/Performance | Inventive Examples | | | | | | | |
|---|---|---|---|---|---|---|---|---|
| | 31 | 32 | 33 | 34 | 35 | 36 | 37 | 38 |
| hose structure | | | | | | | | |
| core inner wall | 1) N6/ACM | 1) N6/ACM | 1) N6/ACM | 1) N6/ACM | 1) N6/ACM | 1) N6/ACM | 1) N6/ACM | 1) N6/ACM |
| thickness (mm) | 0.2 | 0.35 | 0.5 | 1.0 | 1.5 | 0.2 | 0.35 | 0.5 |
| outer wall | 2) EPDM/PP | 2) EPDM/PP | 2) EPDM/PP | 2) EPDM/PP | 2) EPDM/PP | 3) Cl-IIR/ EPDM/PP | 3) Cl-IIR/ EPDM/PP | 3) Cl-IIR/ EPDM/PP |
| thickness (mm) | 1.8 | 1.65 | 1.5 | 1.0 | 0.5 | 1.8 | 1.65 | 1.5 |
| reinforcement | ← polyester → | | | | | | | |
| cover/thickness (mm) | 3) Cl-IIR/ EPDM/PP 2.0 | 3) Cl-IIR/ EPDM/PP 2.0 | 3 Cl-IIR EPDM/P 2.0 | 3) Cl-IIR/ EPDM/PP 2.0 | 3) Cl-IIR/ EPDM/PP 2.0 | 3) Cl-IIR/ EPDM/PP 2.0 | 3) Cl-IIR/ EPDM/PP 2.0 | 3) Cl-IIR/ EPDM/PP 2.0 |
| vulcanization | ← not effected → | | | | | | | |
| hose performance | | | | | | | | |
| flexibility (kgf) | 1.51 | 1.59 | 1.67 | 1.87 | 2.00 | 1.40 | 1.49 | 1.57 |
| gas permeation (gf/m/72 hr) | | | | | | | | |
| CFC 12 | 4.35 | 3.61 | 3.01 | 1.58 | 0.91 | 4.50 | 3.79 | 3.24 |
| HFC 134a | 2.64 | 2.19 | 1.81 | 0.96 | 0.55 | 2.44 | 2.01 | 1.64 |
| moisture permeation (mfg/cm²/day) | 0.12 | 0.12 | 0.14 | 0.15 | 0.19 | 0.07 | 0.11 | 0.11 |
| air tightness | ← not leaked → | | | | | | | |

| Structure/Performance | Inventive Examples | | | | | | | | |
|---|---|---|---|---|---|---|---|---|---|
| | 39 | 40 | 41 | 42 | 43 | 44 | 45 | 46 | 47 |
| hose structure | | | | | | | | | |
| core inner wall | 1) N6/ACM | 1) N6/ACM | 1) N6/ACM | 1) N6/ACM | 1) N6/ACM | 1) N6/ACM | 1) N6/ACM | 1) N6/ACM | 1) N6/ACM |
| thickness (mm) | 1.0 | 1.5 | 0.2 | 0.5 | 1.0 | 1.5 | 1.0 | 1.0 | 1.0 |
| outer wall | 3) Cl-IIR/ EPDM/PP | 3) Cl-IIR/ EPDM/PP | 9) NRR/PP | 9) NRR/PP | 9) NRR/PP | 9) NRR/PP | 3) EPDM/PP | 3) Cl-IIR/ EPDM/PP | 9) NRR/PP |
| thickness (mm) | 1.0 | 0.5 | 1.8 | 1.5 | 1.0 | 0.5 | 1.0 | 1.0 | 1.0 |
| reinforcement | ← polyester → | | | | | | | | |
| cover/thickness (mm) | 3) Cl-IIR/ EPDM/PP 2.0 | 3) Cl-IIR/ EPDM/PP 2.0 | 3 Cl-IIR EPDM/P 2.0 | 3) Cl-IIR/ EPDM/PP 2.0 | 3) Cl-IIR/ EPDM/PP 2.0 | 3) Cl-IIR/ EPDM/PP 2.0 | 2) EPDM/PP 2.0 | 2) EPDM/PP 2.0 | 2) EPDM/PP 2.0 |
| vulcanization | ← not effected → | | | | | | | | |
| hose performance | | | | | | | | | |
| flexibility (kgf) | 1.77 | 1.90 | 1.44 | 1.62 | 1.77 | 1.93 | 1.90 | 1.88 | 1.80 |
| gas permeation (gf/m/72 hr) | | | | | | | | | |
| CFC 12 | 1.76 | 1.16 | 4.01 | 2.70 | 1.38 | 0.78 | 1.53 | 4.37 | 4.09 |
| HFC 134a | 0.78 | 0.42 | 2.75 | 1.98 | 1.10 | 0.72 | 1.01 | 0.84 | 2.82 |
| moisture permeation (mfg/cm²/day) | 0.17 | 0.19 | 0.13 | 0.14 | 0.17 | 0.20 | 0.17 | 0.13 | 0.19 |
| air tightness | ← not leaked → | | | | | | | | |

| Structure/Performance | Comparative Examples | | | | | |
|---|---|---|---|---|---|---|
| | 10 | 11 | 12 | 13 | 14 | 15 |
| hose structure | | | | | | |
| core inner wall | 1) N6/ACM | 5) N6/N11/PO | 5) N6/N11/PO | 5) N6/N11/PO | 5) N6/N11/PO | — |
| thickness (mm) | 1.0 | 0.2 | 0.35 | 0.5 | 1.0 | — |
| outer wall | — | 6) Cl-IIR | 6) Cl-IIR | — | — | 7) NBR |
| thickness (mm) | — | 1.8 | 1.65 | — | — | 2.0 |
| reinforcement | ← polyester → | | | | | |
| cover/thickness (mm) | 4) ETFE 1.0 | 6) Cl-IIR 2.0 | 6) Cl-IIR 2.0 | 6) Cl-IIR 2.0 | 6) Cl-IIR 2.0 | 8) CR 2.0 |
| vulcanization | not | ← effected → | | | | |

TABLE 5-continued

| hose performance | effected | | | | | |
|---|---|---|---|---|---|---|
| flexibility (kgf) | 4.12 | 1.57 | 1.74 | 1.82 | 2.10 | 1.90 |
| gas permeation (gf/m/72 hr) | | | | | | |
| CFC 12 | 1.80 | 2.60 | 2.43 | 1.94 | 0.76 | 22 |
| HFC 134a | 1.95 | 2.35 | 2.12 | 1.74 | 0.68 | 35 |
| moisture permeation ($mfg/cm^2/day$) | 0.20 | 0.10 | 0.10 | 0.16 | 0.14 | 0.60 |
| air tightness | leaked | ← not leaked → | | ← leaked → | | not leaked |

TABLE 6

| Material Property | core inner wall/core N6/ N11/PC 5) | core inner wall N6/ACM 1) | core outer wall/cover Cl-IIR/ EPDM/PP 3) | core outer wall/cover EPDM/PP 2) | core outer wall/cover NBR/PP 9) | cover ETFT 4) | cover Cl-IIR 6) | core NBR 7) | cover CR 8) |
|---|---|---|---|---|---|---|---|---|---|
| tensile elasticity ($kgf/cm^2$) | 3850 | 1600 | — | — | — | 5200 | — | — | — |
| retention of tensile elasticity at 120° C. (%) | 19 | 38 | — | — | — | 14 | — | — | — |
| $M_{50}$ ($kgf/cm^2$) | — | — | 26 | 57 | 38 | — | 18 | 62 | 25 |
| retention of $M_{50}$ (%) | — | — | 31 | 37 | 31 | — | 30 | 43 | 30 |
| gas permeation (gf mm/24 hr $cm^2$) | | | | | | | | | |
| CFC 12 | $2.6 \times 10^{-4}$ | $7.0 \times 10^{-4}$ | 0.657 | 0.632 | 0.341 | $3.8 \times 10^{-4}$ | 0.160 | $2.4 \times 10^{-3}$ | 0.110 |
| HFC 134a | $2.4 \times 10^{-4}$ | $4.3 \times 10^{-4}$ | 0.034 | 0.103 | 0.163 | $4.8 \times 10^{-4}$ | 0.013 | $5.1 \times 10^{-2}$ | 0.025 |
| moisture permeation (gf mm/24 hr $cm^2$) | $10.3 \times 10^{-3}$ | $9.9 \times 10^{-3}$ | $2.27 \times 10^{-3}$ | $5.12 \times 10^{-2}$ | $18.4 \times 10^{-3}$ | $3.1 \times 10^{-3}$ | $1.56 \times 10^{-3}$ | $12.3 \times 10^{-3}$ | $10.75 \times 10^{-3}$ |
| vulcanization | | | ← not effected → | | | | ← effected → | | |

What is claimed is:

1. A highly gas-impermeable, moisture-proof, flexible hose comprising:
   (a) an inner tube formed from a first composition comprised of a graft polymer alloy having a continuous phase constituted of at least one polyamide resin, and a disperse phase composed of an acrylic rubber, said one polyamide resin having been grafted with said acrylic rubber;
   (b) a reinforcing layer disposed over the inner tube and formed of a synthetic fibrous material or a metallic wiry material; and
   (c) an outer cover laminated around the reinforcing layer and formed from a second composition comprised of a thermoplastic elastomer having (a) a continuous phase constituted of a polyolefin resin, and (b) a disperse phase composed of at least one of an ethylene-propylene-diene rubber and a butyl-based rubber, said one rubber having been subjected to vulcanization.

2. The hose according to claim 1 wherein said one polyamide resin in the first composition is nylon 6, nylon 8, nylon 10, nylon 11, nylon 12, nylon 66, nylon 6-nylon 66, nylon 6-nylon 12, nylon 12-nylon 12 or nylon 6-nylon 66-nylon 610 either alone or in combination.

3. The hose according to claim 1 wherein said acrylic rubber in the first composition is a copolymer of an alkyl acrylate ester with a crosslinkable monomer not rich in chlorine, a copolymer of an alkyl acrylate ester with acrylonitrile, a copolymer of an alkyl acrylate ester with an active chlorine-containing monomer, a copolymer of an alkyl acrylate ester with a carboxylic group-containing monomer or a copolymer of an alkyl acrylate ester with an epoxy group-containing monomer.

4. The hose according to claim 1 wherein said polyolefin resin in the second composition is polyethylene, polypropylene, poly-1-butene, poly-1-pentene, poly-4-methyl-1-pentene or poly-5-methyl-1-hexene or a combination thereof.

5. The hose according to claim 1 wherein said ethylene-propylene-diene rubber in the second composition contains as a diene component dicyclopentadiene, ethylidene norbornene or 1,4-hexadiene.

6. The hose according to claim 1 wherein said butyl-based rubber in the second composition is butyl rubber, chlorinated butyl rubber or brominated butyl rubber.

7. The hose according to claim 1 wherein said synthetic fibrous material is a vinylon, polyester, nylon, rayon or aromatic polyamide fiber, and said metallic wiry material is a steel wire.

8. A highly gas impermeable moisture-proof, flexible hose comprising:
   (a) an inner tube including an inner peripheral wall and an outer peripheral wall, the inner peripheral wall being formed from a third composition comprised of at least one polyamide resin or a blend thereof with a polyolefin resin, the outer peripheral wall being formed from a first composition comprised of a graft polymer alloy having a continuous phase constituted of at least one polyamide resin, and a disperse phase composed of an acrylic rubber, said one polyamide resin having been grafted with said acrylic rubber, or from a fourth composition comprised of a thermoplastic elastomer having a continuous phase constituted of a polyolefin resin, and a disperse phase made up of at least one rubber selected from the group consisting of an ethylene-propylene-diene rubber, a butyl-based rubber and an acrylonitrile-butadiene rubber, said one rubber having been subjected to vulcanization;

(b) a reinforcing layer disposed over the outer peripheral wall and formed of a synthetic fibrous material or a metallic wiry material; and (c) an outer cover laminated around the reinforcing layer and formed from a second composition of a thermoplastic elastomer having a continuous phase constituted of a polyolefin resin and a disperse phase composed of at least one of an ethylene-propylene-diene rubber and a butyl-based rubber, said one rubber having been subjected to vulcanization.

9. The hose according to claim 8 wherein said one polyamide resin in the third composition is nylon 6, nylon 8, nylon 10, nylon 11, nylon 12, nylon 66, nylon 6-nylon 66, nylon 6-nylon 12, nylon 12-nylon 12 or nylon 6-nylon 66-nylon 610 either alone or in combination.

10. The hose according to claim 8 wherein said blend in the third composition comprises either one or both of nylon 11 and nylon 12, either one or both of nylon 6 and nylon-6-nylon 66 and a polyolefin resin.

11. The hose according to claim 10 wherein said polyolefin resin is an ethylene or propylene homopolymer, an ethylene-propylene copolymer or a derivative thereof obtainable from reaction with maleic acid.

12. The hose according to claim 8 wherein said one polyamide resin in the first composition is nylon 6, nylon 8, nylon 10, nylon 11, nylon 12, nylon 66, nylon 6-nylon 66, nylon 6-nylon 12, nylon 12-nylon 12 or nylon 6-nylon 66-nylon 610 either alone or in combination.

13. The hose according to claim 8 wherein said acrylic rubber in the first composition is a copolymer of an alkyl acrylate ester with a crosslinkable monomer not rich in chlorine, a copolymer of an alkyl acrylate ester with arylonitrile, a copolymer of an alkyl acrylate ester with an active chlorine-containing monomer, a copolymer of an alkyl acrylate ester with a carboxylic group-containing monomer or a copolymer of an alkyl acrylate ester with an epoxy group-containing monomer.

14. The hose according to claim 8 wherein said polyolefin in the fourth composition is polyethylene, polypropylene, poly-1-butene, poly-1-pentene, poly-4-methyl-1-pentene or poly-5-methyl-1-hexene or a combination thereof.

15. The hose according to claim 8 wherein said ethylene-propylene-diene rubber in the fourth composition contains as a diene component dicyclopentadiene, ethylidene norbornene or 1,4-hexadiene.

16. The hose according to claim 8 wherein said butyl-based rubber in the fourth composition is butyl rubber, chlorinated butyl rubber or brominated butyl rubber.

17. The hose according to claim 8 wherein said polyolefin resin in the second composition is polyethylene, polypropylene, poly-1-butene, poly-1-pentene, poly-4-methyl-1-pentene or poly-5-methyl-1-hexene or a combination thereof.

18. The hose according to claim 8 wherein said ethylene-propylene-diene rubber in the second composition contains as a diene component dicyclopentadiene, ethylidene norbornene or 1,4-hexadiene.

19. The hose according to claim 8 wherein said butyl-based rubber in the second composition is butyl rubber, chlorinated butyl rubber or brominated butyl rubber.

20. The hose according to claim 8 wherein said synthetic fibrous material is a vinylon, polyester, nylon, rayon or aromatic polyamide fiber, and said metallic wiry material is a steel wire.

21. The hose according to claim 1, wherein said hose is formed without vulcanization.

22. The hose according to claim 8, wherein said hose is formed without vulcanization.

23. A highly gas-impermeable, moisture-proof, flexible hose comprising:

(a) an inner tube including an inner peripheral wall and an outer peripheral wall, the inner peripheral wall being formed from a first composition comprised of a graft polymer alloy having a continuous phase constituted of at least one polyamide resin and a disperse phase composed of an acrylic rubber, said one polyamide resin having been grafted with said acrylic rubber, the outer peripheral wall being formed from a fourth composition comprised of a thermoplastic elastomer having a continuous phase constituted of a polyolefin resin and a disperse phase made up of at least one rubber selected from the group consisting of an ethylene-propylene-diene rubber, a butyl-based rubber and an acrylonitrile-butadiene rubber, said one rubber having been subjected to vulcanization;

(b) a reinforcing layer disposed over the outer peripheral wall and formed of a synthetic fibrous material or a metallic wiry material; and (c) an outer cover laminated around the reinforcing layer and formed from a second composition of a thermoplastic elastomer having a continuous phase constituted of a polyolefin resin and a disperse phase composed of at least one of an ethylene-propylene-diene rubber and a butyl-based rubber, said one rubber having been subjected to vulcanization.

24. The hose according to claim 23 wherein said one polyamide resin in the first composition is nylon 6, nylon 8, nylon 10, nylon 11, nylon 12, nylon 66, nylon 6-nylon 66-nylon 610 either alone or in combination.

25. The hose according to claim 23 wherein said acrylic rubber in the first composition is a copolymer of an alkyl acrylate ester with a crosslinkable monomer not rich in chlorine, a copolymer of an alkyl acrylate ester with acrylonitrile, a copolymer of an alkyl acrylate ester with an active chlorine-containing monomer, a copolymer of an alkyl acrylate ester with a carboxylic group-containing monomer or a copolymer of an alkyl acrylate ester with an epoxy group-containing monomer.

26. The hose according to claim 23 wherein said polyolefin in the fourth composition is polyethylene, polypropylene, poly-1-butene, poly-1-pentene, poly-4-methyl-1-pentene or poly-5-methyl-1-hexene or a combination thereof.

27. The hose according to claim 23 wherein said ethylene-propylene-diene rubber in the fourth composition contains as a diene component dicyclopentadiene, ethylidene norbornene or 1,4-hexadiene.

28. The hose according to claim 23 wherein said butyl-based rubber in the fourth composition is butyl rubber, chlorinated butyl rubber or brominated butyl rubber.

29. The hose according to claim 23 wherein said polyolefin resin in the second composition is polyethylene, polypropylene, poly-1-butene, poly-1-pentene, poly-4-methyl-1-pentene or poly-5-methyl-1-hexene or a combination thereof.

30. The hose according to claim 23 wherein said ethylene-propylene-diene rubber in the second composition contains as a diene component dicyclopentadiene, ethylidene norbornene or 1,4-hexadiene.

31. The hose according to claim 23 wherein said butyl-based rubber in the second composition is butyl rubber, chlorinated butyl rubber or brominated butyl rubber.

32. The hose according to claim 23 wherein said synthetic fibrous material is a vinylon, polyester, nylon, rayon or aromatic polyamide fiber, and said metallic wiry material is a steel wire.

33. The hose according to claim 23 wherein said hose is formed without vulcanization.

* * * * *